(12) United States Patent
Mahmoud et al.

(10) Patent No.: US 11,708,520 B2
(45) Date of Patent: Jul. 25, 2023

(54) CEMENTING FORMULATIONS CONTAINING HALLOYSITE AND SILICA FLOUR AND METHODS OF USE

(71) Applicant: King Fahd University of Petroleum and Minerals, Dhahran (SA)

(72) Inventors: Ahmed Abdulhamid Mahmoud, Dhahran (SA); Salaheldin Elkatatny, Dhahran (SA); Mohamed Mahmoud, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/454,909

(22) Filed: Jun. 27, 2019

(65) Prior Publication Data

US 2023/0174843 A1 Jun. 8, 2023

(51) Int. Cl.
| | |
|---|---|
| *C09K 8/487* | (2006.01) |
| *C09K 8/592* | (2006.01) |
| *C04B 7/02* | (2006.01) |
| *C04B 14/06* | (2006.01) |
| *C04B 14/10* | (2006.01) |
| *C04B 103/50* | (2006.01) |
| *C04B 103/46* | (2006.01) |

(52) U.S. Cl.
CPC ............... *C09K 8/487* (2013.01); *C04B 7/02* (2013.01); *C04B 14/06* (2013.01); *C04B 14/10* (2013.01); *C09K 8/592* (2013.01); *C04B 2103/46* (2013.01); *C04B 2103/50* (2013.01); *C09K 2208/10* (2013.01); *C09K 2208/28* (2013.01)

(58) Field of Classification Search
None
See application file for complete search history.

(56) References Cited

U.S. PATENT DOCUMENTS

2014/0090842 A1* 4/2014 Patil ................... C04B 40/0039
166/293
2018/0072938 A1 3/2018 Mazyar et al.

FOREIGN PATENT DOCUMENTS

| CN | 2 761 840 | 8/2017 |
|---|---|---|
| CN | 106007545 B | 1/2018 |
| GB | 2 353 523 | 2/2001 |

OTHER PUBLICATIONS

Reches, et al. ; Agglomeration and reactivity of nanoparticles of SiO , TiO , Al O , Fe O , and clays in cement pastes and effects on compressive strength at ambient and elevated temperatures ; Construction and Building Materials, vol. 167 ; pp. 860-873 ; Apr. 10, 2018 ; Abstract Only ; 2 Pages.

(Continued)

*Primary Examiner* — Charles R Nold
(74) *Attorney, Agent, or Firm* — Oblon, McClelland, Maier & Neustadt, L.L.P.

(57) ABSTRACT

Cementing compositions containing a hydraulic cement, halloysite nanoparticles, and silica flour. The cementing compositions may optionally include other additives such as a friction reducer, a defoamer, and a fluid loss additive. Cement samples made therefrom and methods of producing such cement samples are also specified. The addition of halloysite nanoparticles and silica flour provides enhanced mechanical strength (e.g. compressive strength, flexural strength) and improved durability (e.g. resistance to $CO_2$ and salinity) to the cement, making them suitable cementing material for oil and gas wells.

20 Claims, 5 Drawing Sheets

(56) References Cited

OTHER PUBLICATIONS

Farzadnia, et al. ; Effect of halloysite nanoclay on mechanical properties, thermal behavior and microstructure of cement mortars ; Cement and Concrete Research 48 ; pp. 97-104 ; Mar. 13, 2013 ; 8 Pages.

* cited by examiner

CEMENTING FORMULATIONS CONTAINING HALLOYSITE AND SILICA FLOUR AND METHODS OF USE

BACKGROUND OF THE INVENTION

Technical Field

The present disclosure relates to cementing compositions including a hydraulic cement, halloysite nanoparticles, silica flour, and cement additives, cement slurry made therefrom suitable for oil and gas wells, and methods for producing the compositions and cements.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Major functions of primary cementing in oil wells include: 1) providing mechanical stability, 2) preventing any communications between drilled formations by eliminating the presence of cement/formation annulus, 3) protecting the casing from corrosive formation fluids, and 4) preventing formation fluids from flowing toward the surface. During primary cementing operations, the annular space between the wellbore and casing is filled by one or more cement slurries which are intended to harden and produce a durable cement matrix that provides sufficient isolation capability throughout the well lifecycle [Rabia, H., 2001. Well Engineering and Construction. Entrac Consulting. Chapter 6, Page 203].

Operating conditions of the well are important to be considered during cement slurry design. The impact of temperature on the liquid phase slurry pumped through the casing/wellbore annular space and on the solid phase (hydrated cement) was addressed by Luke [Luke, K., 2004. Phase studies of pozzolanic stabilized calcium silicate hydrates at 180° C. Cement and Concrete Research 34, 1725-1732], Vu et al. [Vu, M., Sulem, J., Laudet, J. B., 2012. Effect of the curing temperature on the creep of a hardened cement paste, Cement and Concrete Research 42, 1233-1241], Shahab et al. [Shahab, S., Moradi, T., Nikolaev, N. I., Naseri, Y., 2015. Developing high resistant cement systems for high-pressure, high temperature applications. SPE Russian Petroleum Technology Conference, Moscow, Russia], Costa et al. [Costa, B. L. S., Souza, G. G., Freitas, J. C. O., Araujo, R. G. S., Santos, P. H. S., 2017. Silica content influence on cement compressive strength in wells subjected to steam injection. Journal of Petroleum Science and Engineering 158, 626-633], and Wang [Wang, W. C., 2017. Compressive strength and thermal conductivity of concrete with nanoclay under Various High Temperatures. Construction and Building Materials 147, 305-311].

Mechanical properties of hydrated Portland cement are expected to alter at high-temperature conditions since the elevated temperature adversely affects the cement hydrated products [Costa, B. L. S., Souza, G. G., Freitas, J. C. O., Araujo, R. G. S., Santos, P. H. S., 2017. Silica content influence on cement compressive strength in wells subjected to steam injection. Journal of Petroleum Science and Engineering 158, 626-633]. Elevated temperature conditions are common in deep wells and wells subjected to steam injection for enhanced oil recovery (EOR). Currently, thermal oil recovery is a widely used technique around the world to produce heavy oil. Exemplary thermal oil recovery projects can be found at: 1) Kern Field in California, USA, 2) the Athabasca Oil Sands in Alberta, Canada, 3) Mene Grande in Venezuela, 4) Northeast Region in Brazil, and 5) the Surplacul de Barcau Field in Romania [Curtis, C., Kopper, R., Decoster, E., Guzman-Garcia, A., Huggins, C., Knauer, L., Minner, M., Kupsch, N., Linares, L., Rough, H., Waite, M., 2002. Heavy-oil reservoirs. Schlumberger Oilfield Review, (Autumn 2002); Panait-Patica, A., Serban, D., Ilie, N., Pavel, L., Barsan, N., 2006. Suplacu de Barcau Field—A Case History of a Successful In-Situ Combustion Exploitation (January 1). Society of Petroleum Engineers; and Ichim, A., Teodoriu, H. C., 2017. Investigations on the surface well cement integrity induced by thermal cycles considering an improved overall transfer coefficient. Journal of Petroleum Science and Engineering 154, 479-487].

Major chemical and microstructural transformations occur when Portland cement is exposed to high-temperature conditions (e.g. when temperature exceeds 110° C.). This phenomenon is known as strength retrogression, which intensifies as the temperature reaches beyond 110° C. [Taylor, H. F. W., 1990. Cement Chemistry, First edition. Thomas Telford, London; Luke, K., 2004. Phase studies of pozzolanic stabilized calcium silicate hydrates at 180° C. Cement and Concrete Research 34, 1725-1732; and Nelson, E. B., Guillot, D., 2006. Well Cementing, Second edition. Schlumberger, Sugar Land, Texas]. Calcium-rich products are formed in the cement matrix during strength retrogression, which could increase the cement matrix permeability and deteriorate its mechanical properties.

Early studies have shown that the addition of silica ($SiO_2$) particles (usually greater than 30% BWOC) into the cement when the temperature exceeds 110° C. might help preventing strength retrogression. The interaction of $SiO_2$ particles with portlandite phase ($Ca(OH)_2$ or CH), which is one of the main products of the cement hydration process, often leads to formation of other stable phases of calcium silicate hydrates (CSH) such as tobermorite, trucostite, and xonotlite, and thus enhanced cement matrix mechanical properties [Eilers, L. H., Root, R. L., 1976. Long-term Effects of High Temperature on Strength Retrogression of Cements. Annual California Regional Meeting of the Society of Petroleum Engineers of AIME, Long Beach, Calif.; Taylor, H. F. W., 1990. Cement Chemistry, First edition. Thomas Telford, London; Nelson, E. B., Guillot, D., 2006. Well Cementing, Second edition. Schlumberger, Sugar Land, Tex.; Richardson, I. G., 2008. The calcium silicate hydrates. Cement and Concrete Research 38(2), 137-158; and Iverson, B., Maxson, J., Bour, D., 2010. Strength retrogression in cements under high temperature conditions. Thirty-fifth Workshop on Geothermal Reservoir Engineering, Stanford Calif.]. Table 1 summarizes the reaction velocities of the silicate (pozzolan) cement hydration and the reaction of CH with the pozzolan.

TABLE 1

Cement hydration and pozzolan reaction description (Bezerra et al., 2011)

| Reaction | Reaction velocity |
|---|---|
| $2C_3S + 6H \rightarrow$ C—S—H (61%) + CH | Fast → hours and days |
| $2C_2S + 4H \rightarrow$ C—S—H (82%) + CH | Fast → days |

TABLE 1-continued

Cement hydration and pozzolan reaction description
(Bezerra et al., 2011)

| Reaction | Reaction velocity |
|---|---|
| Pozzolan + CH + H → C—S—H (pozzolanic reaction) | Slow → days to months |

Costa et al. [Costa, B. L. S., Souza, G. G., Freitas, J. C. O., Araujo, R. G. S., Santos, P. H. S., 2017. Silica content influence on cement compressive strength in wells subjected to steam injection. Journal of Petroleum Science and Engineering 158, 626-633, incorporated herein by reference in its entirety] examined the use of silica particles to enhance the resistance of oil wells cement to high-temperature conditions. They reported addition of 35% BWOC of silica particles could enhance the cement tolerance to high-temperature conditions of 300° C.

Proper storage of carbon dioxide ($CO_2$) in underground formations requires an effective seal between the storage formation and $CO_2$ injection wellbore containing oil well cement (OWC) [Duguid, A., Radonjic, M., Scherer, G. W., 2011. Degradation of cement at the reservoir/cement interface from exposure to carbonated brine. International Journal of Greenhouse Control 5, 1413-1428]. Flow of $CO_2$ out of the storage formation damages the cement matrix, causing safety concerns regarding the application of geologic carbon storage (GCS) such as potable groundwater contamination [Bachu, S., Bennion, D. B., 2009. Experimental assessment of brine and/or $CO_2$ leakage through well cements at reservoir conditions. International Journal of Greenhouse Gas Control 3, 494-501; and Connell, L., Down, D., Lu, M., Hay, D. Heryanto, D., 2015. An investigation into the integrity of wellbore cement in $CO_2$ storage wells: Core flooding experiments and simulations. International Journal of Greenhouse Gas Control 37, 424-440].

To prevent leakage of stored $CO_2$ into the deep saline aquifers which are at a depth of less than 1 kilometer, the cement matrix should be strong and durable enough to ensure that the leakage rate does not exceed 0.1% in a year over at least 1000 years [Kutchko, B. G., Strazisar, B. R., Dzombak, D. A., Lowry, G. V., Thaulow, N., 2007. Degradation of well cement by $CO_2$ under geologic sequestration conditions. Environmental Science and Technology 41, 4787-4792]. However, at high pressure and high temperature (HPHT) conditions, the injected $CO_2$ is expected to dissolve into the saline or brine present in the pores of storage formations and form acidic brine. The acidic brine can chemically react with the cement matrix, and hence, alter its composition, increase its permeability, and considerably weaken its structure [Carey, J. W., Svec, R., Grigg, R., Zhang, J., Crow, W., 2010. Experimental investigation of wellbore integrity and $CO_2$-brine flow along the casing-cement microannulus. International Journal of Greenhouse Gas Control 4, 272-282; Duguid, A., Radonjic, M., Scherer, G. W., 2011. Degradation of cement at the reservoir/cement interface from exposure to carbonated brine. International Journal of Greenhouse Control 5, 1413-1428; and Li, Q., Lim, Y. M., Flores, K. M., Kranjc, K., Jun, Y. S., 2015a. Chemical reactions of Portland cement with aqueous $CO_2$ and Their impacts on cement's mechanical properties under geologic $CO_2$ sequestration conditions. Environmental Science and Technology 49, 6335-6343].

As shown by Eq. 1, when $CO_2$ is dissolved into the formation brine, $H^+$ and $HCO_3^-$ ions are produced which is followed by formation of $CO_3^{2-}$. The reaction of $CO_3^{2-}$ with CH leads to calcium dissolution and subsequent formation of calcite ($CaCO_3$) as shown in Eq. 2.

$$CO_2 + H_2O \rightarrow H^+ + HCO_3^- \leftrightarrow 2H^+ + CO_3^{2-} \qquad \text{Eq. 1}$$

$$Ca(OH)_2 + 2H^+ + CO_3^{2-} \rightarrow H^+ + Ca^{2+} + HCO_3^- + OH^- \qquad \text{Eq. 2}$$

Dissolution of previously formed $CaCO_3$ and formation of additional $HCO_3^-$ is constant as long as the system is supplied with $CO_2$ (Eq. 2). As a result, calcium carbonate leaching occurs as summarized by Eq. 3.

$$CO_2 + H_2O \rightarrow H^+ + HCO_3^- \leftrightarrow 2H^+ + CO_3^{2-} \qquad \text{Eq. 3}$$

The interaction of the CSH, which is another major cement hydration product, with the acidic brine results in CSH decomposition and subsequent formation of amorphous silicate gel (Eq. 4). This process may considerably increase the porosity of the cement matrix, thus reducing the strength. Compared with curing at atmospheric conditions, casting cement slurries in deep wells at high pressure and high temperature may reduce the CSH permeability and increase matrix hardness, thereby improving its resistance against the diffusion-driven chemical reaction [Griffin, A. S., Rahman, M. K., Kim, J. J., Taha, M. R., 2013. The significance of nanosilica on degradation of oil well cement in carbonated brine environments, Ninth International Conference on Creep, Shrinkage, and Durability Mechanics (CONCREEP-9) Cambridge, Mass., USA; and Jeong, Y. J., Youm, K. S., Yun, T. S., 2018. Effect of nano-silica and curing conditions on the reaction rate of class G well cement exposed to geological $CO_2$-sequestration conditions. Cement and Concrete Research 109, 208-216].

$$H^+ + C\text{—}S\text{—}H \leftrightarrow Ca^{2+} + am\text{-}SiO_2 + H_2O \qquad \text{Eq. 4}$$

The above chemical reaction between the acidic brine and the cement matrix results in the formation of three distinct zones named the CH; depletion, carbonation, and degradation formations [Abdoulghafour, H., Luquot, L., Gouze, P., 2013. Characterization of the mechanisms controlling the permeability changes of fractured cements flowed through by $CO_2$-rich brine. Environmental Science and Technology 47, 10332-10338; Luquot, L., Abdoulghafour, H., Gouze, P., 2013. Hydro-dynamically controlled alteration of fractured Portland cements flowed by $CO_2$-rich brine. International Journal of Greenhouse Gas Control 16, 167-179; and Walsh, S. D. C., Mason, H. E., Du Frane, W. L., Carroll, S. A., 2014. Mechanical and hydraulic coupling in cement-caprock interfaces exposed to carbonated brine. International Journal of Greenhouse Gas Control 25, 109-120].

The use of complementary additives to improve the cement resistance to carbonation was investigated at atmospheric and high pressure and high temperature conditions [API, 1991. Worldwide Cementing Practices, API, Dallas, Tex., USA; Roy, D. M., Arjunan, P., Silsbee, M. R., 2001. Effect of silica fume, metakaolin, and low calcium fly ash on chemical resistance of concrete. Cement and Concrete Research 31, 1809-1813; Sideris, K. K., Savva, A. E., Papayianni, J., 2006. Sulfate resistance and carbonation of plain and blended cements. Cement and Concrete Composites 28, 47-56; and Neville, A. M., 2011. Properties of Concrete, 5th edition, Pearson Education Limited, Edinburgh, England]. Compared with the regular OWC, pulverized fly ash (PFA)-based cement is able to produce more homogenous cement matrix and more stable hydration products including CSH products via pozzolanic reaction. As shown in Eq. 5, pozzolanic reaction is a secondary chemical reaction between the amorphous silica particles and portlandite component (which is not stable at acidic conditions) which produces a more stable form of CSH [Roy, D. M., Arjunan, P., Silsbee, M. R., 2001. Effect of silica fume, metakaolin, and low calcium fly ash on chemical resistance of concrete. Cement and Concrete Research 31, 1809-1813; Sideris, K. K., Savva, A. E., Papayianni, J., 2006. Sulfate resistance and carbonation of plain and blended cements. Cement and Concrete Composites 28, 47-56; and Neville, A. M., 2011. Properties of Concrete, 5th edition, Pearson Education Limited, Edinburgh, England].

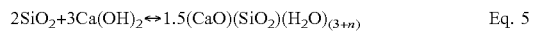

$$2SiO_2 + 3Ca(OH)_2 \leftrightarrow 1.5(CaO)(SiO_2)(H_2O)_{(3+n)} \quad \text{Eq. 5}$$

Several research works used nanosilica as a supplementary additive to the cement since these nanoparticles may facilitate pozzolanic reaction by increasing the fraction of silicate being converted to CSH [Stefanidou, M., Papayianni, I., 2012. Influence of nano-$SiO_2$ on the Portland cement pastes. Compos Part B 43(6), 2706-2710; Griffin, A. S., Rahman, M. K., Kim, J. J., Taha, M. R., 2013. The significance of nanosilica on degradation of oil well cement in carbonated brine environments, Ninth International Conference on Creep, Shrinkage, and Durability Mechanics (CONCREEP-9) Cambridge, Mass., USA; Collodetti, G., Gleize, P. J. Monteiro, P. J., 2014. Exploring the potential of siloxane surface modified nano-$SiO_2$ to improve the Portland cement pastes hydration properties. Construction and Building Materials 54, 99-105; Griffin, A., Kim, J. J., Rahman, M. K., Mahmoud, M., Taha, R., 2015. Microstructure of a type G oil well cement-nanosilica blend. Journal of Materials in Civil Engineering 27, 04014166; and Moon, J. H., Taha, M. R., Youm, K. S., Kim, J. J., 2016. Investigation of pozzolanic reaction in nanosilica-cement blended pastes based on solid-state kinetic models and 29Si MAS NMR. Materials 9(2)]. The nanosilica is able to promote rapid hydration reactions, which may enhance the early-age strength, reduce cement matrix permeability [Kawashima, S., Hou, P., Corr, D. J., Shah, S. P., 2013. Modification of cement-based materials with nanoparticles. Cement and Concrete Composites 36, 8-15; and Krakowiak, K. J., Thomas, J. J., Musso, S., James, S., Akono, A. T., Ulm, F. J., 2015. Nanochemo-mechanical signature of conventional oil-well cement systems: effects of elevated temperature and curing time. Cement and Concrete Research 67, 103-121, each incorporated herein by reference in their entirety], and increase overall cement matrix mechanical properties [Chithra, S., Kumar, S. S., Chinnaraju, K., 2016. The effect of colloidal nano-silica on workability, mechanical and durability properties of high performance concrete with copper slag as partial fine aggregate. Construction and Building Materials 113, 794-804, incorporated herein by reference in its entirety].

In view of the forgoing, one objective of the present disclosure is to provide cementing formulations having cement and effective amounts of halloysite nanoparticles and silica flour as additives for enhanced properties. A further objective of the present disclosure is to provide OWC based on said cementing formulations and to provide methods for making the cement slurry. The disclosed OWC exhibit satisfactory mechanical properties under high-pressure high-temperature (HPHT) environments and maintain structural integrity upon exposure to $CO_2$ and salinity.

BRIEF SUMMARY OF THE INVENTION

According to a first aspect, the present disclosure relates to cementing composition comprising a hydraulic cement, a silica flour, and halloysite nanoparticles, wherein i) the silica flour and the halloysite nanoparticles are unmodified, ii) a weight ratio of the hydraulic cement to the silica flour is in a range of 2:1 to 6:1, iii) a weight ratio of the hydraulic cement to the halloysite nanoparticles is in a range of 20:1 to 200:1, and iv) the cementing composition is devoid of ground granulated blast furnace slag.

In one embodiment, a weight ratio of the hydraulic cement to the silica flour is in a range of 2.5:1 to 3.5:1.

In one embodiment, a weight ratio of the hydraulic cement to the halloysite nanoparticles is in a range of 25:1 to 100:1.

In one embodiment, the hydraulic cement is Saudi Class G hydraulic cement.

In one embodiment, the cementing composition further comprises at least one additive selected from the group consisting of a friction reducer, a fluid loss additive, and a defoamer.

In one embodiment, the cementing composition consists essentially of the hydraulic cement, the silica flour, the halloysite nanoparticles, a friction reducer, a defoamer, and a fluid loss additive, wherein i) a weight ratio of the hydraulic cement to the friction reducer is in a range of 50:1 to 250:1, ii) a weight ratio of the hydraulic cement to the defoamer is in a range of $10^7$: 1 to $10^9$: 1, and iii) a weight ratio of the hydraulic cement to the fluid loss additive is in a range of 60:1 to 275:1.

According to another aspect, the present disclosure relates to a cement slurry containing the aforementioned cementing composition and water, wherein a weight ratio of the hydraulic cement to the water is in a range of 1:1 to 4:1.

According to another aspect, the present disclosure relates to a method of cementing a portion of a wellbore. The method involves the steps of introducing the aforementioned cement slurry into the portion of the wellbore, and allowing the cement slurry to cure, thereby forming a wellbore cement.

In one embodiment, the wellbore has a temperature in a range of 50-300° C., and a pressure of 0.1-20 MPa.

In one embodiment, the wellbore cement has a compressive strength of 4,000-11,000 psi, and a tensile strength of 500-1,000 psi.

In one embodiment, the method further involves exposing the wellbore cement to $CO_2$, saline, or both.

In one embodiment, the wellbore cement has a compressive strength 20-40% greater than that of a substantially identical cement not formed with the halloysite nanoparticles.

In one embodiment, the wellbore is a $CO_2$ injection wellbore, or a $CO_2$ sequestration wellbore.

In one embodiment, the cementing composition consists essentially of the hydraulic cement, the silica flour, the halloysite nanoparticles, and a friction reducer, wherein a weight ratio of the hydraulic cement to the friction reducer is in a range of 50:1 to 250:1.

According to another aspect, the present disclosure relates to a cement slurry containing the aforementioned cementing composition, and water, wherein a weight ratio of the hydraulic cement to the water is in a range of 1:1 to 4:1.

According to another aspect, the present disclosure relates to a method of cementing a portion of a wellbore. The method involves the steps of introducing the aforementioned cement slurry into the portion of the wellbore, and allowing the cement slurry to cure, thereby forming a wellbore cement.

In one embodiment, wherein the wellbore has a temperature of 200-400° C., and wherein the wellbore cement has a compressive strength 20-30% greater than that of a substantially identical cement not formed with the silica flour and the halloysite nanoparticles.

In one embodiment, the method further involves exposing the wellbore cement to steam injection.

In one embodiment, the wellbore is a steam injection wellbore, or a high-pressure high-temperature wellbore.

In one embodiment, the wellbore is at least one selected from the group consisting of a horizontal wellbore, a vertical wellbore, and a multi-lateral wellbore.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
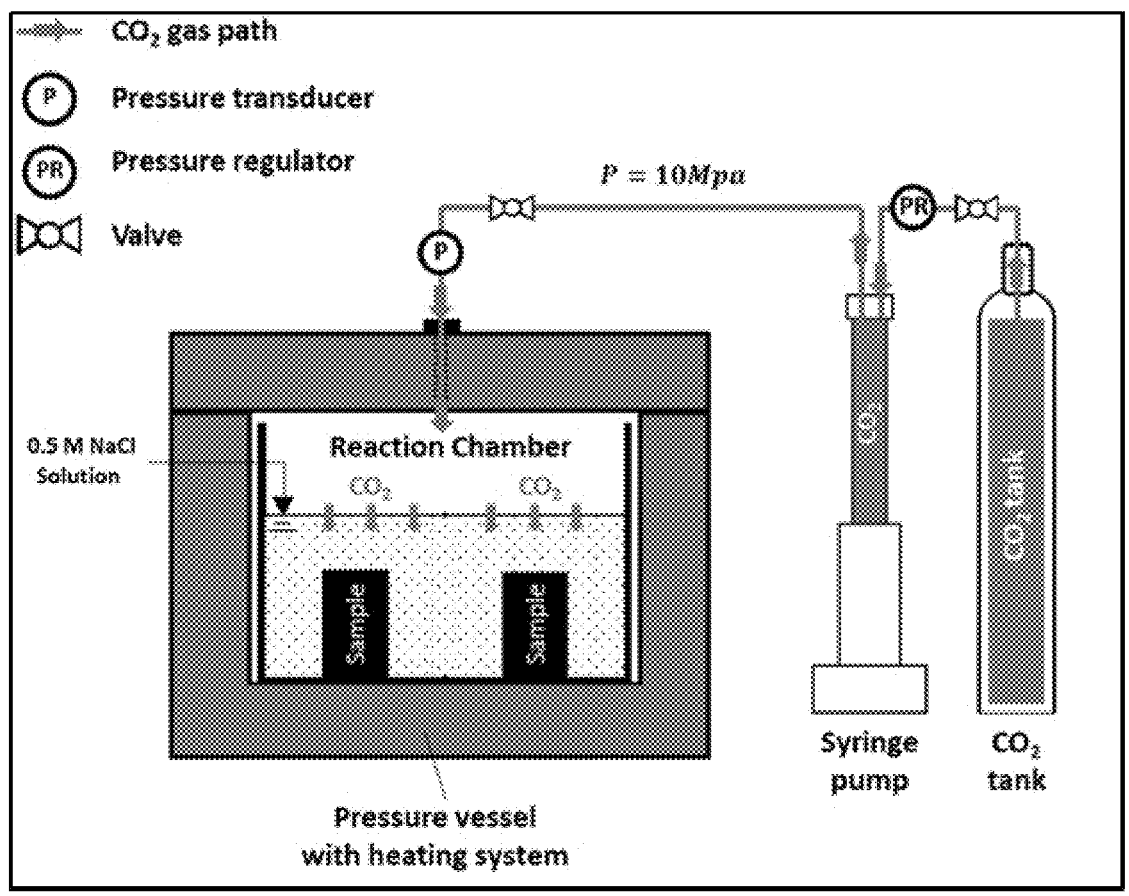
FIG. 1 is a schematic drawing of the reaction chamber.

Embodiments of the present disclosure will now be described more fully hereinafter with reference to the accompanying drawings, in which some, but not all embodiments of the disclosure are shown.

As used herein, the words "a" and "an" and the like carry the meaning of "one or more." Within the description of this disclosure, where a numerical limit or range is stated, the endpoints are included unless stated otherwise. Also, all values and subranges within a numerical limit or range are specifically included as if explicitly written out.

As used herein, the word "about" may be used when describing magnitude and/or position to indicate that the value and/or position described is within a reasonable expected range of values and/or positions. For example, a numeric value may have a value that is ±1% of the stated value (or range of values), ±2% of the stated value (or range of values), ±5% of the stated value (or range of values), ±10% of the stated value (or range of values), or ±15% of the stated value (or range of values).

According to a first aspect, the present disclosure relates to a cementing composition including a hydraulic cement, a silica flour, and halloysite nanoparticles.

As used herein, a particle size (i.e. average diameter, average particle diameter) of particles refers to the average linear distance measured from one point on the particle through the center of the particle to a point directly across from it for a distribution of particles.

The silica flour used herein may comprise particles of crystalline silica ($SiO_2$), preferably α-quartz, having a particle size of 1-500 μm, preferably 5-250 μm, preferably 10-200 μm, preferably 20-150 μm, preferably 40-100 μm. In one embodiment, the silica flour comprises greater than 95 wt % $SiO_2$, preferably greater than 98 wt % of $SiO_2$, more preferably greater than 99 wt % $SiO_2$. In other embodiments, silica flour may be referred to as silica sand, silica powder, or quartz sand.

Non-limiting examples of silica flour include fine silica flour, silica flour, silica sand and mixtures thereof. Fine silica flour is crystalline silica having a particle size smaller than 20 μm, preferably a particle size of 1-18 μm, 2-15 μm, or 5-10 μm. Silica flour is crystalline silica which may be produced by grinding silica sand. The particle size of silica flour is generally in the range of 20-50 μm, preferably in the range of 25-45 μm, or 30-40 μm. Silica sand is also crystalline silica and may have a particle size in the range of 80-500 μm, preferably 100-400 μm, 150-300 μm, or 200-250 μm. In an alternative embodiment, the cementing composition may comprise silica in a different form, including but not limited to, fumed silica, amorphous silica, and β-quartz. An example of amorphous silica is micro-silica having a particle size of less than 1 μm.

Nanoparticles may be classified according to their dimensions. Three-dimensional nanoparticles preferably have all dimensions of less than 100 nm, and generally encompass isodimensional nanoparticles. Examples of three dimensional nanoparticles include, but are not limited to nanospheres, nanogranules and nanobeads. Two-dimensional nanoparticles have two dimensions of less than 100 nm, generally including diameter. Examples of two-dimensional nanoparticles include, but are not limited to, nanosheets, nanoplatelets, nanolaminas and nanoshells. One-dimensional nanoparticles have one dimension of less than 100 nm, generally thickness. Examples of one-dimensional nanoparticles include, but are not limited to, nanorods, nanotubes, nanofibers and nanowhiskers.

The interaction of nanoclay (NC) with free lime during the hydration process may lead to production of secondary CSH gel that could effectively fill the cement matrix capillary pores [Hakamy, A., Shaikh, F. U. A., Low, I. M., 2014. Characteristics of hemp fabric reinforced nanoclay-cement nanocomposites. Cement and Concrete Composites 50, 27-35; and Hakamy, A., Shaikh, F. U. A., Low, I. M., 2015. Characteristics of nanoclay and calcined nanoclay-cement nanocomposites. Composites Part B 78, 174-184], and thus, densifying the microstructure of the matrix. The resistance of the cement sheath to the carbonation process could be considerably improved when the amount of CSH components of the hydration process increases [Yang, Y., Yuan, B., Wang, Y., Zhang, S., Zhu, L., 2016. Carbonation resistance cement for $CO_2$ storage and injection wells. Journal of Petroleum Science and Engineering 146, 883-889, incorporated herein by reference in its entirety]. Wang [Wang, W. C., 2017. Compressive strength and thermal conductivity of concrete with nanoclay under Various High Temperatures. Construction and Building Materials 147, 305-311, incorporated herein by reference in its entirety] studied the effect of replacing the ordinary Portland cement (OPC) with 0.1 to 0.5% of the nanoclay (NC) particles on the concrete strength at a temperature ranging from 25 to 1000° C. The author reported that the NC particles were able to enhance the compressive strength of the concrete at a temperature of up to 300° C. However, a significant decrease in the compressive strength of the concrete was noticed when the temperature was between 440 to 580° C., and the compressive strength of the concrete reduced to about 10% of the original strength when the temperature reached 1000° C.

Because of their potential ability to fill micropores of the matrix due to considerably small particle size, halloysite nanoparticles (HNP) may be used in cement industry to enhance the strength and density of the solidified cement matrix.

Nanoclays are nanoparticles of naturally occurring layered mineral silicates, and may be categorized into different classes such as halloysite nanoclay, montmorillonite nanoclay, bentonite nanoclay, kaolinite nanocaly, and hectorite nanoclay depending on chemical composition and morphology. In a preferred embodiment, the cementing composition comprises halloysite nanoparticles (i.e. halloysite nanoclay). Halloysite is an aluminosilicate clay mineral having a 1:1 atom ratio of Al:Si and an empirical formula $Al_2Si_2O_5(OH)_4$ or $Al_2Si_2O_5(OH)_4.2H_2O$. Halloysite typically forms via hydrothermal alteration of aluminosilicate minerals.

Halloysite nanoparticles are naturally occurring and in the form of small tubules that morphologically resemble nanotubes. Alternatively, the halloysite nanoparticles of the present disclosure are envisaged to demonstrate a variety of morphologies including, but not limited to, nanosheets, nanoplatelets, nanocrystals, nanospheres, nanohexagons, nanodisks, nanocubes, nanowires, nanofibers, nanoribbons, nanorods, nanocylinders, nanogranules, nanowhiskers, nanoflakes, nanofoils, nanopowders, nanoboxes, nanostars, tetrapods, nanobelts, nanaourchins, nanofloweres, and mixtures thereof. In a preferred embodiment, at least 90% of a total population of the halloysite nanoparticles used herein is in the form of nanotubes, preferably at least 95%, preferably at least 96%, preferably at least 97%, preferably at least 98%, preferably at least 99% of the total population of the halloysite nanoparticles is in the form of nanotubes.

In one or more embodiments, the halloysite nanoparticles of the present disclosure are in the form of nanotubes having an outer diameter of 30-70 nm, 35-60 nm, or 40-50 nm and a length of 0.5-10 μm, 1-8 μm, 2-6 μm, or 3-4 μm. In one related embodiment, the halloysite nanoparticles are in the form of nanotubes having an inner diameter of 5-15 nm, 7-12 nm, or 9-10 nm. Specific surface area is a property of solids which is the total surface area of a material per unit of mass, solid or bulk volume, or cross sectional area. Pore volume and surface area may be measured by gas adsorption analysis, preferably $N_2$ adsorption analysis. In one embodiment, the halloysite nanoparticles have a specific surface area of 50-200 $m^2/g$, preferably 60-150 $m^2/g$, more preferably 70-100 $m^2/g$. In a related embodiment, the halloysite nanoparticles have a pore volume of 1-4 mL/g, preferably 1.25-2 mL/g, more preferably 1.5-1.75 mL/g. The halloysite nanoparticles used herein may be available from commercial vendors including, without limitation, Sigma Aldrich, Reade Advanced Materials, and American Elements. It is envisaged that the present disclosure may be adapted to incorporate other types of nanoclays including, but not limited to, kaolinite nanocaly, montmorillonite nanoclay, bentonite nanoclay, and hectorite nanoclay in addition to or in lieu of the halloysite nanoparticles.

As used herein, "functionalized fillers" include both non-covalently functionalized and covalent functionalized fillers (e.g. silica flour, nanoclays). Non-covalent functionalization may be based on van der Walls forces, hydrogen bonding, ionic interactions, dipole-dipole interactions, hydrophobic or π-π interactions. Covalent functionalization means that the functional groups are covalently bonded to a filler (e.g. silica flour, nanoclays) directly or via an organic moiety. In preferred embodiments, the aforementioned silica flour and halloysite nanoparticles used herein are unmodified (i.e. not functionalized with a functional group). In at least one embodiment, the silica flour and halloysite nanoparticles used herein are not functionalized with a sulfonate group, a phosphonate group, a carboxylate group, a carboxyl group, a sulfonic acid group, an amine group, or a phosphonic acid group.

Slag is the glass-like by-product left over after a desired metal has been separated (i.e., smelted) from its raw ore. Blast furnace slag is a by-product obtained during the production (e.g. quenching) of metal products and objects including iron, copper, brass, and others. As used herein, a ground granulated blast furnace slag (GGBFS) may be obtained by quenching molten iron slag (a by-product of iron and steel-making) from a blast furnace in water or steam, to produce a glassy, granular product that is then dried and ground into a fine powder. GGBFS typically contains elevated concentrations of calcium oxide, silicon dioxide, and aluminum. In some embodiments, the cementing composition described herein may comprise substantially no GGBFS, for instance, less than 0.1 wt % of GGBFS, preferably less than 0.05 wt %, more preferably less than 0.01 wt % of GGBFS, relative to a total weight of the cementing composition. In at least one embodiment, the cementing composition described herein is devoid of GGBFS. In a related embodiment, the cementing composition of the present disclosure is devoid of blast furnace slag.

In one embodiment, the cementing composition does not comprise fly ash, volcanic ash, and/or limestone. As used herein, fly ash is a byproduct generated during the burning of pulverized coal in electric power plants. Fly ash generally contains $SiO_2$, $Al_2O_3$, $Fe_2O_3$ and CaO. Depending upon the specific coal bed composition, other constituents of fly ash may include arsenic, beryllium, boron, cadmium, chromium, hexavalent chromium, cobalt, lead, manganese, mercury, molybdenum, selenium, strontium, thallium, vanadium, dioxins, PAH compounds and unburnt carbon. Volcanic ash, which is created during volcanic eruptions, contains fragments of pulverized rock, minerals, and volcanic glass. As used herein, limestone refers to a sedimentary rock composed largely of the minerals calcite and aragonite, which are different crystal forms of calcium carbonate ($CaCO_3$). Limestone is naturally occurring and can be found in skeletal fragments of marine organisms such as coral, forams, and molluscs. In another embodiment, the cementing composition does not comprise silica fume. Silica fume is an amorphous (non-crystalline) polymorph of silica that is collected as a by-product of the silicon and ferrosilicon alloy production.

As used herein, the term "cement" refers to a composition or substance with one or more constituents that are capable of binding other materials together once cured. Generally, cement may include a number of dry constituents chosen based on the desired ratio or class of cement to be produced. Thus, cement refers to a dry composition before curing unless the context clearly dictates otherwise, for example, in a cement slurry, or in a cured cement material.

As used herein, the terms "cement sample" and "cement samples" refer to the cured cement composition. Thus, "cement sample" and "cement samples" refer to a dry cement composition after curing.

The cementing composition disclosed herein may include a cement. In one embodiment, the cement used herein may include hydraulic cement, non-hydraulic cement, or a combination thereof. In a preferred embodiment, the cement is hydraulic cement. The cement may comprise Portland cement, a basic ingredient of concrete, mortar, stucco, and/or non-specialty grout, which is present as a fine powder, and produced by heating limestone and clay materials in a kiln to form clinker, grinding the clinker, and adding small amounts of other materials. Exemplary Portland cement includes, without limitation, ordinary Portland cement (OPC) type I, type II, type III, type IV, type V, and a combination thereof (in accordance with either ASTM C 150 or European EN-197 standard). Portland cement type IA, type IIA, and/or type IIIA may also be used, which have the same composition as type I, II, and III except that an air-entraining agent is ground into the mix (also in accord with the ASTM C 150 standard).

Additional cement types include hydraulic cements, Saudi Class G hydraulic cement, non-hydraulic cements, Portland fly ash cement, Portland Pozzolan cement, Portland silica fume cement, masonry cements, EMC cements, stuccos, plastic cements, expansive cements, white blended cements, Pozzolan-lime cements, slag-lime cements, supersulfated cements, calcium aluminate cements, calcium sulfoaluminate cements, geopolymer cements, Rosendale cements, polymer cement mortar, lime mortar, and/or pozzolana mortar.

Typically, hydraulic cements, particularly Portland cements, are used to cement the well casing within the wellbore. Hydraulic cements set and develop compressive strength due to the occurrence of a hydration reaction which allows them to set or cure under water. The physical properties of the set cement relate to the crystalline structure of the calcium-silicate-hydrates formed during hydration. For example, conventional Portland cements form an interlocking crystalline network of, for example, tricalcium silicate, dicalcium silicate, tetracalcium aluminum ferrite and calcium hydroxide crystals. These crystals interconnect to form an interlocking crystalline structure which provides both flexural strength and a degree of resiliency. Hydration products of Portland cements may also form crystalline or amorphous interlocking networks of the hydration products calcium silicate hydrate (CSH, or C—S—H), calcium hydroxide (CH, or Portlandite), calcium silicate (Larnite), aluminum calcium iron oxide (such as $Ca_2FeAlO_5$), and/or silicon dioxide.

The term "hydraulic cement" refers to any inorganic cement that hardens or sets due to hydration. Hydraulic cements, for instance, include Portland cements, aluminous cements, pozzolan cements, fly ash cements, and the like. Thus, for example, any of the oil well type cements of the class "A-H" as listed in the API Spec 10, (1st ed., 1982), are suitable hydraulic cements. In one or more embodiments, the hydraulic cement is selected from the group consisting of Saudi Class G hydraulic cement, API Class A Portland cement, API Class C Portland cement, API Class G Portland cement, and API Class H Portland cement. In a preferred embodiment, the hydraulic cement is Saudi Class G hydraulic cement. In one embodiment, the cement is in the dry form. If needed to set, water is typically added after the cement is mixed with other components or ingredients, for example, silica flour, the halloysite nanoparticles, and it is then ready to be hardened or set.

In one or more embodiments, a weight ratio of the hydraulic cement to the silica flour present in the cementing composition is in a range of 2:1 to 6:1, preferably 2.2:1 to 5.5:1, preferably 2.5:1 to 5:1, preferably 2.8:1 to 4:1, preferably 3:1 to 3.5:1. In a most preferred embodiment, the weight ratio of the hydraulic cement to the silica flour is in a range of 2.5:1 to 3.5:1, 2.7:1 to 3.1:1, or about 2.86:1. However, in certain embodiments, the weight ratio of the hydraulic cement to the silica flour is less than 2:1 or greater than 6:1. In a related embodiment, the silica flour is present in the cementing composition at an amount in a range of 16% by weight of cement (BWOC) to 50% BWOC, preferably 20% BWOC to 45% BWOC, preferably 25% BWOC to 40% BWOC, preferably 30% BWOC to 37% BWOC, or about 35% BWOC.

In one or more embodiments, a weight ratio of the hydraulic cement to the halloysite nanoparticles present in the cementing composition is in a range of 20:1 to 200:1, preferably 25:1 to 150:1, preferably 30:1 to 100:1, preferably 40:1 to 75:1, preferably 45:1 to 60:1, preferably 50:1 to 55:1. In a most preferred embodiment, the weight ratio of the hydraulic cement to the halloysite nanoparticles is in a range of 25:1 to 100:1, 28:1 to 50:1, 30:1 to 40:1, or about 33:1. However, in certain embodiments, the weight ratio of the hydraulic cement to the halloysite nanoparticles is less than 20:1 or greater than 200:1. In a related embodiment, the halloysite nanoparticles are present in the cementing composition at an amount in a range of 0.5% BWOC to 5% BWOC, preferably 1% BWOC to 4.5% BWOC, preferably 1.5% BWOC to 4% BWOC, preferably 2% BWOC to 3.5% BWOC, preferably 2.5% BWOC to 3.2% BWOC, or about 3% BWOC.

In some embodiments, the cementing composition of the present disclosure further comprises a friction reducer. Friction reducers, also known as dispersants, thinners, or turbulence inducers, are used mainly to control cement slurry rheological properties for better mixing and pumping. They may reduce friction between cement slurry particles, resulting in a lower pumping pressure requirement, and also reducing water-to-cement ratio, which may improve cement compressive strength. In addition, dispersants are used to create turbulent flow for improved mud removal from the wellbore. Exemplary friction reducers include, but are not limited to, calcium lignosulfonate, sodium lignosulfonate, naphthalene sulfonates, polynaphthalenesulfonates, phenol sulfonates, phosphates, phosphonates, sulfonated styrene maleic anhydride, sulfonated styrene, maleimide, polyacrylates, polymethacrylates, and hydroxycarboxylic acids (e.g. citric acid). In one embodiment, the friction reducer used herein is Halliburton CFR-3 friction reducer. When a friction reducer is present in the cementing composition, a weight ratio of the hydraulic cement to the friction reducer is in a range of 50:1 to 250:1, preferably 75:1 to 200:1, more preferably 100:1 to 150:1. In a related embodiment, the friction reducer is present in the cementing composition at an amount in a range of 0.4% BWOC to 2% BWOC, preferably 0.5% BWOC to 1.5% BWOC, preferably 0.6% BWOC to 1.2% BWOC, preferably 0.7% BWOC to 1% BWOC, or about 0.8% BWOC.

In at least one embodiment, the cementing composition consists essentially of the hydraulic cement, the silica flour, the halloysite nanoparticles, and the friction reducer. Preferably, weight ratios of the hydraulic cement to each of the other components (i.e. the silica flour, the halloysite nanoparticles, and the friction reducer) are the same as previously described.

In some embodiments, the cementing composition further comprises a fluid loss additive. Fluid loss additives, or fluid loss control agents, are used to control the rate at which a cement slurry loses water and to maintain it within the acceptable industry standards. Controlling fluid loss rate is an important issue to be considered when cementing across permeable formations, where it could be damaged by the cement slurry filtrate. Exemplary fluid loss additives include, but are not limited to, guar gums and derivatives, welan gum, xanthan gum, poly(ethyleneimine), AMPS polymer (i.e. poly(2-acrylamido-2-methyl-1-propanesulfonic acid), cellulose and derivatives such as carboxymethyl hydroxyethyl cellulose, carboxymethyl cellulose, and hydroxyethyl cellulose, and polystyrene sulfonate. In one embodiment, the fluid loss additive used herein is Halliburton's HALAD-344 fluid loss additive. When a fluid loss additive is present in the cementing composition, a weight ratio of the hydraulic cement to the fluid loss additive is in a range of 60:1 to 275:1, preferably 80:1 to 200:1, more preferably 100:1 to 150:1. In a related embodiment, the fluid loss additive is present in the cementing composition at an amount in a range of 0.35% BWOC to 2% BWOC, preferably 0.4% BWOC to 1.5% BWOC, preferably 0.5% BWOC to 1% BWOC, preferably 0.6% BWOC to 0.9% BWOC, or about 0.75% BWOC.

In some embodiments, the cementing composition further comprises a defoamer. Defoamers are anti-foaming agents used to minimize air entrainment (e.g. frothing, foaming) that often occurs during cement slurry mixing process. The entrapped air in the cement slurry may cause damages to the pumps in the field, and may also cause incorrect density of cement slurry. Exemplary defoamers include, but are not limited to, silicone based defoamers, polyethylene glycol and polypropylene glycol copolymers based defoamers, and oil-based defoamers, alkyl polyacrylates and polyether polymer. In one embodiment, the defoamer used herein is D-Air 4000L defoamer. When a defoamer is present in the cementing composition, a weight ratio of the hydraulic cement to the defoamer is in a range of $10^7$:1 to $10^9$:1, preferably $5 \times 10^7$:1 to $5 \times 10^8$:1, more preferably $10^8$:1 to $3 \times 10^8$:1. In a related embodiment, the fluid loss additive is present in the cementing composition at an amount in a range of $(10^{-8})$% BWOC to $(10^{-6})$% BWOC, preferably $(5 \times 10^{-8})$% BWOC to $(8 \times 10^{-7})$% BWOC, preferably $(10^{-7})$% BWOC to $(6 \times 10^{-7})$% BWOC, preferably $(2 \times 10^{-7})$% BWOC to $(5 \times 10^{-7})$% BWOC, or about $(4.7 \times 10^{-7})$% BWOC.

In at least one embodiment, the cementing composition consists essentially of the hydraulic cement, the silica flour, the halloysite nanoparticles, the friction reducer, the defoamer, and the fluid loss additive. Preferably, weight ratios of the hydraulic cement to each of the other components (i.e. the silica flour, the halloysite nanoparticles, the friction reducer, the defoamer, and the fluid loss additive) are the same as previously described.

According to another aspect, the present disclosure relates to a wet cement slurry containing water and the cementing composition disclosed herein in any of its embodiments. The water may be potable water, tap water, freshwater or seawater, and may be taken from a natural source, such as an aquifer, lake, or ocean, and may be filtered to remove large solids before using. A brine, which is an aqueous mixture of one or more soluble salts (e.g. sodium chloride, potassium chloride, calcium chloride, calcium bromide, sodium bromide, potassium bromide, zinc bromide), may be used as water. Seawater or water from a salt lake may be considered a brine.

In one or more embodiments, a weight ratio of the hydraulic cement to the water is in a range of 1:1 to 4:1, preferably 1.5:1 to 3.5:1, preferably 1.8:1 to 3:1, preferably 2:1 to 2.5:1, or about 2.3:1. In related embodiments, the water may be present in the wet cement slurry in an amount of 10-40 wt % by weight of the wet cement slurry, preferably 15-30 wt %, more preferably 20-25 wt % by weight of the wet cement slurry. In general, the amount of water used in the wet cement slurry depends upon the type of hydraulic cement selected and the job conditions at hand. Thus, in other embodiments, the water may be present in the wet cement slurry in an amount of less than 10 wt % or greater than 40 wt % by weight of the wet cement slurry. The amount of water used may vary over a wide range, depending upon factors such as the chemical identity of the cement and the required consistency of the wet cement slurry.

According to another aspect, the present disclosure relates to a cement involving the wet cement slurry disclosed herein in any of its embodiments in a cured form.

The cement may be made by sequentially pouring different components into a concrete mixer (e.g. a paddle mixer, a drum mixer, a rotating mixer). For example, the aforementioned cementing composition including the hydraulic cement, the silica flour, and the halloysite nanoparticles are dry-mixed in a concrete mixer for a time period ranging from 30 seconds-30 minutes, 60 seconds-20 minutes, or 5-10 minutes. Preferably, mixing the hydraulic cement, the silica flour, and the halloysite nanoparticles forms a homogeneous dry mixture.

Following the dry mixing process, water is added to the dry mixture to form a wet cement slurry. The water is slowly poured into the concrete mixer while the concrete mixer turns the dry mixture for a time period ranging from 1-10 minutes, 2-8 minutes, or 3-6 minutes thereby forming a wet cement mixture. Preferably, the water is mixed into the dry mixture for a time period of 1-30 minutes, 2-10 minutes, or about 5 minutes. After a thorough mixing, optional additives such as the friction reducer, the defoamer, and the fluid loss additive may be slowly poured into the concrete mixer, and the wet cement mixture is further mixed for a time period of 1-10 minutes, 2-8 minutes, or 3-6 minutes thereby forming the wet cement slurry.

The wet cement slurry containing the hydraulic cement, the silica flour, and the halloysite nanoparticles, water, optional friction reducer, defoamer, and fluid loss additive may be then casted into a mold thereby forming a casted wet cement. The wet cement slurry may be compacted in the mold by using a steel rod or a trowel. In one embodiment, the casted wet cement may be cured at a temperature of 10-400° C., preferably 38-300° C., preferably 60-200° C., preferably 95-150° C. for a time period of 0.1-7 days, 0.5-5 days, or 1-3 days and then removed from the mold, which results in a cement.

The cement may be left to further cure for a length of time necessary to achieve a desired mechanical property, such as a desired compressive strength. Preferably the cement, left to cure, will harden with a mechanical strength (e.g. compressive or tensile strength) that increases over the curing time. However, a strength will reach a maximum value within a certain time of curing, for example, within 30 days. In one embodiment, the cement may be left to further cure for a time period of 1-30 days, preferably 5-28 days, more preferably 14-21 days, though in certain embodiments, the cement may be considered cured in less than 1 day or after 30 days. The cement may be further cured at a temperature of 10-400° C., preferably 38-300° C., preferably 60-200° C., preferably 95-150° C. Methods of preparing and curing wet cement slurries are generally known to those skilled in the art.

As defined herein, compressive strength is the capacity of a material or structure to withstand compressive loads, as opposed to tensile strength, which is the capacity of a material or structure to withstand tensile loads. In one or more embodiments, the cement described herein has a compressive strength of 4,000-14,000 psi, preferably 6,000-12,000 psi, preferably 8,000-11,000 psi, preferably 9,000-10,500 psi, preferably 9,500-10,000 psi (see FIGS. 2 and 5). In one or more embodiments, the cement described herein has a tensile strength of 500-1,200 psi, preferably 600-1,000 psi, preferably 700-900 psi, preferably 750-850 psi (see FIGS. 3 and 6). In some embodiments, the compressive strength and the tensile strength are determined after further curing the cement for 1-8 days, 2-7 days, or 3-5 days.

According to a further aspect, the present disclosure relates to a method of cementing a portion of a wellbore. The method involves the steps of introducing the wet cement slurry of the present disclosure into the portion of the wellbore, and allowing the wet cement slurry to cure, thereby forming a wellbore cement.

The wet cement slurry containing the cementing composition may be used in wellbore cementing operations such as primary cementing where strings of pipe (e.g. casings and liners) are cemented in wellbores. In one embodiment, the wet cement slurry is introduced into and cured within an annulus existing between a pipe and a formation of a wellbore, thus producing a cured cement material (i.e. wellbore cement) between the pipe and the formation of the wellbore. The wellbore cement may physically support and position the pipe within the wellbore and prevent undesirable migration of fluids between formations of the wellbore.

In one or more embodiments, the wellbore is at least one selected from the group consisting of a horizontal wellbore, a vertical wellbore, and a multi-lateral wellbore. As used here, a "vertical wellbore" is a wellbore that has a vertical section, which is substantially perpendicular to a surface of the ground. As used here, a "horizontal wellbore" refers to a wellbore that has a vertical section and a horizontal lateral section with an inclination angle (an angle between the vertical section and the horizontal lateral section) of at least 70°, or at least 80°, or in a range of 85° to 90°. The horizontal wellbore may enhance a reservoir performance due to an increased reservoir contact provided by the horizontal lateral section. As used here, a "multi-lateral wellbore" refers to a wellbore that has a main/central borehole and a plurality of laterals extend outwardly therefrom.

The method of the present disclosure is applicable to HPHT (high-pressure high-temperature) wellbores. In one or more embodiments, the wellbore has a temperature in in a range of 25-400° C., preferably 50-350° C., preferably 75-300° C., preferably 95-250° C., preferably 100-200° C., preferably 125-175° C., preferably 150-160° C. In a related embodiment, the wellbore has a pressure in a range of 0.1-20 MPa, preferably 0.5-18 MPa, preferably 1-16 MPa, preferably 2-14 MPa, preferably 5-12 MPa, preferably 8-10 MPa. However, the present method may be applicable to wellbores having a temperature of less than 25° C. or greater than 400° C., or a pressure of less than 0.1 MPa or greater than 20 MPa.

The presence of the silica flour and the halloysite nanoparticles strengthens the wellbore cement obtained according to the present method, especially under high temperature conditions (e.g. >90° C.). In one embodiment, when the wellbore has a temperature of 200-400° C., preferably 250-350° C., or about 300° C., the wellbore cement has a compressive strength 200-350% greater than that of a substantially identical cement not formed with the silica flour and the halloysite nanoparticles, preferably 220-300% greater, preferably 240-280% grater, preferably 250-260% greater than that of a substantially identical cement not formed with the silica flour and the halloysite nanoparticles (see FIG. 5).

Figure 6:
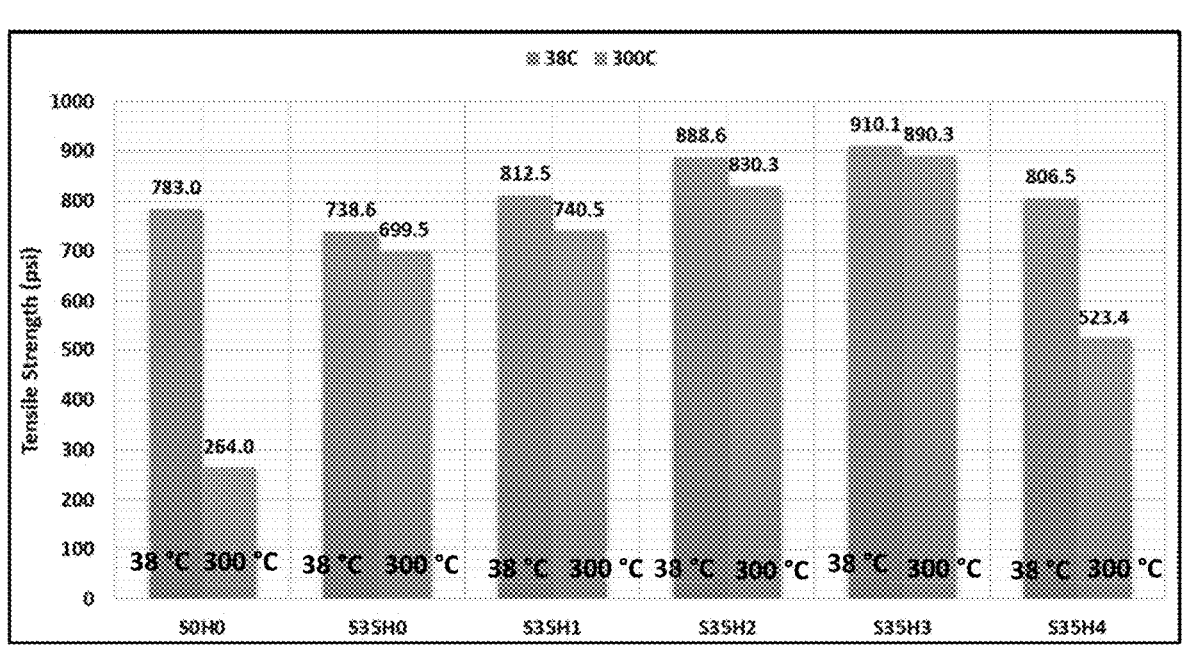
FIG. 6 is a graph summarizing the tensile strength of S0H0, S35H0, S35H1, S35H2, S35H3, and S35H4 cement samples cured at 38° C. and 300° C., respectively for 7 days.

In a related embodiment, when the wellbore has a temperature of 200-400° C., preferably 250-350° C., or about 300° C., the wellbore cement has a tensile strength 90-300% greater than that of a substantially identical cement not formed with the silica flour and the halloysite nanoparticles, preferably 120-275% greater, preferably 150-250% grater, preferably 175-200% greater than that of a substantially identical cement not formed with the silica flour and the halloysite nanoparticles (see FIG. 6). In one or more embodiments, the method further involves exposing the wellbore cement to steam injection with a temperature of 200-400° C., preferably 250-350° C., or about 300° C. In a preferred embodiment, the wellbore is a steam injection wellbore, or a high-pressure high-temperature wellbore.

In one embodiment, the cured wellbore cement may be further exposed to $CO_2$. In a related embodiment, the curing of the wellbore cement is performed in the presence of $CO_2$. $CO_2$ may be present in an aqueous medium in a wellbore at saturated concentrations, or at a concentration in a range of 0.001-10 M, 0.01-8 M, 0.1-6 M, 0.2-4 M, 0.4-2 M, or 0.5-1 M. The wellbore cement disclosed by the present method tolerates the presence of $CO_2$ in a wellbore. In a preferred embodiment, the wellbore is a $CO_2$ injection wellbore, or a $CO_2$ sequestration wellbore.

As used herein, brine is an aqueous mixture of one or more soluble salts (e.g. sodium chloride, potassium chloride, calcium chloride, calcium bromide, sodium bromide, potassium bromide, zinc bromide, magnesium chloride). Seawater or water from a salt lake may be considered a brine. In one embodiment, the cured wellbore cement may be further exposed to a brine. In a related embodiment, the curing of the wellbore cement is performed in the presence of a brine. For example, the brine may contain 0.1-10 wt %, 0.5-8 wt %, or 1-5 wt % sodium chloride (NaCl) relative to a total weight of the brine. The brine may further contain 0.1-0.8 wt %, 0.15-0.6 wt %, or 0.2-0.4 wt % calcium chloride, as well as 0.05-0.7 wt %, 0.1-0.5 wt %, or 0.15-0.25 wt % magnesium chloride, each relative to a total weight of the brine. In certain embodiments, the method involves exposing the wellbore cement to $CO_2$ present at saturated concentrations in the saline.

In a related embodiment, after exposing the wellbore cement to $CO_2$, saline, or both for 0.1-25 days, 1-20 days, 5-18 days, 7-15 days, or 10-12 days, the wellbore cement has a compressive strength 20-40% greater than that of a substantially identical cement not formed with the halloysite nanoparticles, preferably 22-38% greater, preferably 25-35% greater, preferably 28-32% greater than that of a substantially identical cement not formed with the halloysite nanoparticles. In one embodiment, after exposing the wellbore cement to $CO_2$, saline, or both for 0.1-25 days, 1-20 days, 5-18 days, 7-15 days, or 10-12 days, the compressive strength of the wellbore cement decreases by less than 3%, preferably less than 2.5%, preferably less than 2% relative to that of the same wellbore cement before the exposing (see FIG. 2).

In another related embodiment, after exposing the wellbore cement to $CO_2$, saline, or both for 0.1-25 days, 1-20 days, 5-18 days, 7-15 days, or 10-12 days, the wellbore cement has a tensile strength 12-30% greater than that of a substantially identical cement not formed with the halloysite nanoparticles, preferably 14-25% greater, preferably 15-20% greater, preferably 16-18% greater than that of a substantially identical cement not formed with the halloysite nanoparticles. In one embodiment, after exposing the wellbore cement to $CO_2$, saline, or both for 0.1-25 days, 1-20 days, 5-18 days, 7-15 days, or 10-12 days, the tensile strength of the wellbore cement decreases by less than 3%, preferably less than 2%, preferably less than 1.5% relative to that of the same wellbore cement before the exposing (see FIG. 3).

In another related embodiment, after exposing the wellbore cement to $CO_2$, saline, or both for 0.1-25 days, 1-20 days, 5-18 days, 7-15 days, or 10-12 days, the wellbore cement has a porosity 15-40% less than that of a substantially identical cement not formed with the halloysite nanoparticles, preferably 18-35% less, preferably 20-30% less, preferably 22-25% less than that of a substantially identical cement not formed with the halloysite nanoparticles. In one embodiment, after exposing the wellbore cement to $CO_2$, saline, or both for 0.1-25 days, 1-20 days, 5-18 days, 7-15 days, or 10-12 days, the porosity of the wellbore cement increases by less than 7%, preferably less than 5%, preferably less than 4% relative to that of the same wellbore cement before the exposing (see FIG. 4A).

In a further related embodiment, after exposing the wellbore cement to $CO_2$, saline, or both for 0.1-25 days, 1-20 days, 5-18 days, 7-15 days, or 10-12 days, the wellbore cement has a permeability 40-70% less than that of a substantially identical cement not formed with the halloysite nanoparticles, preferably 45-65% less, preferably 50-60% less, preferably 52-55% less than that of a substantially identical cement not formed with the halloysite nanoparticles. In one embodiment, after exposing the wellbore cement to $CO_2$, saline, or both for 0.1-25 days, 1-20 days, 5-18 days, 7-15 days, or 10-12 days, the permeability of the wellbore cement increases by less than 9%, preferably less than 8%, preferably less than 5% relative to that of the same wellbore cement before the exposing (see FIG. 4B).

The presently disclosed cementing composition and wet cement slurry may be applicable to other cementing operations known in the art, including, without limitation, long string cementing, liner cementing, inflatable packer cementing, and squeeze cementing. Such cementing operations may be drilling, completion and remedial cementing operations, including those performed on existing completed wellbores, as well as those performed during well abandonment operations.

The examples below are intended to further illustrate protocols for preparing, characterizing the cementing compositions and cements and uses thereof, and are not intended to limit the scope of the claims.

Example 1

Materials: HNP0 and HNP1

Two cement slurries, namely HNP0 and HNP1 were formulated using OWC (oil well cement), silica flour, deionized water, friction reducer, fluid loss, and defoamer additives. The base formulation has no HNP and the second slurry further contains 1.0% BWOC of HNP. The cement slurries compositions are summarized in Table 1.

TABLE 1

Cement slurries HNP0 and HNP1 compositions

| Slurries | Cement (g) | Silica Flour (% BWOC) | Friction Reducer (% BWOC) | Fluid Loss Additive (% BWOC) | Defoamer (% BWOC) | Water (% BWOC) | Nanoclay Particles (% BWOC) |
|---|---|---|---|---|---|---|---|
| HNP0 | 600 | 35 | 0.8 | 0.75 | 4.7E−07 | 44 | 0 |
| HNP1 | 600 | 35 | 0.8 | 0.75 | 4.7E−07 | 44 | 1 |

Example 2

Sample Preparation: HNP0 and HNP1

The cement slurries in Table 1 were prepared and tested following the American Petroleum Institute procedure [API, 2013. API Recommended Practice 10B-2-Recommended Practice for Testing Well Cements, second edition American Petroleum Institute, Washington]. The first slurry (HNP0) had no HNP while 1.0% BWOC of HNP was added to the second mixture (HNP1). After preparation of the mixtures, some of the slurries were poured into 50.8 mm edge metallic cubical molds to make samples for compressive strength testing. Some slurries were poured into cylindrical molds of 38.1 mm in diameter and 50.8 mm in length to make samples for porosity and permeability measurements. The remaining slurries were poured into cylindrical molds of 38.1 mm in diameter and 22.9 mm in length to make samples for tensile strength testing. One week after preparation, all samples were subjected to $CO_2$ saturated brine at 95° C. and 10 MPa for specific time periods. Each time samples of every specimen were collected and tested for changes in their properties.

Example 3

GCS Reaction Conditions: HNP0 and HNP1

After sample preparation, the cement slurries were poured into metallic molds with the dimensions needed for the specific test. All the samples were then cured at 95° C. and 10 MPa for 24 hours in 0.5 M NaCl solution. The samples were kept for one week before being moved into a reaction chamber. As shown in FIG. 1, the samples were immersed into 0.5 NaCl solution and reacted with injected $CO_2$ under 95° C. and 10 MPa for 5, 10, 20, and 30 days. At the end of each time period, samples obtained from slurries (HNP0 and HNP1) were removed from the chamber and tested.

Example 4

Unconfined Compression Strength (UCS) Test: HNP0 and HNP1

The compressive strength of the samples was evaluated according to the API procedure [API, 2013. API Recommended Practice 10B-2-Recommended Practice for Testing Well Cements, second edition American Petroleum Institute, Washington]. After 0, 5, 10, and 20 days of reaction with the $CO_2$ saturated brine, three cubes representing each composition were collected and tested for the UCS.

Example 5

Porosity and Permeability Measurements: HNP0 and HNP1

The porosity and permeability of different cement matrix compositions were measured based on their cylindrical samples of 38.1 mm in diameter and 50.8 mm in length. The porosity was measured using the Helium porosimeter method and the permeability was measured applying Darcy's law using nitrogen as the measuring fluid. The changes in the cement matrix porosity and permeability were identified after 0, 5, 10, and 20 days of reaction with the $CO_2$ saturated brine.

Example 6

Tensile Strength Measurements: HNP0 and HNP1

Cylindrical samples of 38.1 mm in diameter and 22.9 mm in length were prepared for tensile strength testing. These samples were prepared using the cylindrical molds used to prepare the samples for porosity and permeability measurements, and then the length was reduced to 22.9 mm. The indirect tensile strength testing method (Brazilian test) was used to indirectly measure the maximum load the sample could withstand before falling under tension. Eq. 6 was used to calculate the tensile strength of the sample, $$\sigma_t = \frac{2P}{\pi dl} \qquad \text{Eq. 6}$$

where $\sigma_t$ denotes the Brazilian tensile strength in (MPa), P is the failure load in (N), d and l are the cement sample diameter and length, respectively, both are in (mm).

The tensile force of the cement sheath was measured after 0, 5, 10, and 20 days of reaction with the $CO_2$ saturated brine.

Example 7

Materials: S0H0, S35H0, S35H1, S35H2, S35H3, and S35H4

The slurries, namely S0H0, S35H0, S35H1, S35H2, S35H3, and S35H4 were formulated using class G cement, silica flour, silica flour, friction reducer additive, different concentrations of the HNP, and deionized water. The cement slurries compositions are summarized in Table 2.

TABLE 2

Cement slurries S0H0, S35H0, S35H1, S35H2, S35H3, and S35H4 compositions

| Slurries | Cement (g) | Silica Flour (% BWOC) | Friction Reducer (% BWOC) | Water (% BWOC) | Nanoclay Particles (% BWOC) |
|---|---|---|---|---|---|
| S0H0 | 600 | 0 | 0.8 | 44 | 0 |
| S35H0 | 600 | 35 | 0.8 | 44 | 0 |
| S35H1 | 600 | 35 | 0.8 | 44 | 1 |
| S35H2 | 600 | 35 | 0.8 | 44 | 2 |
| S35H3 | 600 | 35 | 0.8 | 44 | 3 |
| S35H4 | 600 | 35 | 0.8 | 44 | 4 |

Example 8

Sample Preparation: S0H0, S35H0, S35H1, S35H2, S35H3, and S35H4

The cement slurries were prepared and tested following the American Petroleum Institute procedure [API, 2013. API Recommended Practice 10B-2-Recommended Practice for Testing Well Cements, second edition American Petroleum Institute, Washington]. Six slurries with compositions listed in Table 2 were prepared. The first slurry (S0H0) has no SF and no HNP in its formulation which is considered as the base case. 35% BWOC of SF was added to the second formulation (S35H0). As shown in Table 2, S35H1, S35H2, S35H3 and S35H4 slurries incorporate 1.0, 2.0, 3.0, and 4.0% BWOC of the HNP, respectively.

After slurry preparation, some of the slurries were poured into 50.8 mm edge metallic cubical molds for compressive strength testing. The remaining slurries were poured into cylindrical molds of 38.14×76.2 mm for permeability measurements and tensile strength testing. The molds were then submerged into a water bath at 38° C. for a specific amount of time. All formulations in Table 2 were evaluated in two different scenarios. A low temperature of 38° C. (first scenario) was used as a reference evaluation, and a high temperature of 300° C. (second scenario) was used to simulate the average temperature for wells undergoing cyclic steam injection during EOR.

In case of the first scenario, the samples were submerged into the water bath for 7 days before being tested for the UCS, tensile strength, and permeability. For second scenario, samples were kept in the water bath at the low temperature of 38° C. for 4 days and then subjected to the high temperature of 300° C. and a pressure of 3000 psi for 3 more days (7 days total) to simulate one cycle of steam injection condition. The samples were then tested and compared with those in the first scenario (low temperature).

Example 9

The UCS Testing: S0H0, S35H0, S35H1, S35H2, S35H3, and S35H4

The compressive strength of the samples was evaluated according to the API procedure [API, 2013. API Recommended Practice 10B-2-Recommended Practice for Testing Well Cements, second edition American Petroleum Institute, Washington]. For each temperature condition, three cubical samples with 50.8 mm edge of each composition (Table 2) were used to evaluate the cement matrix average compressive strength.

Example 10

Permeability Measurements: S0H0, S35H0, S35H1, S35H2, S35H3, and S35H4

The permeability of cylindrical samples of 38.14×76.2 mm with different cement matrix compositions was measured by applying the Darcy's law using nitrogen as the measuring fluid.

Example 11

Tensile Strength Measurements: S0H0, S35H0, S35H1, S35H2, S35H3, and S35H4

Cylindrical samples of 38.14)×22.9 mm were prepared for the purpose of tensile strength testing. The indirect tensile strength testing method (Brazilian test) was used to measure the maximum load that the sample could withstand before falling under tension. Eq. 6 was used to calculate the tensile strength of the sample, $$\sigma_t = \frac{2P}{\pi dl} \qquad \text{Eq. 6}$$

where $\sigma_t$ denotes the Brazilian tensile strength in (MPa), P is the failure load in (N), d and l are the cement sample diameter and length, respectively, both are in (mm).

Example 12

Non-Evaporable Water Content: S0H0, S35H0, S35H1, S35H2, S35H3, and S35H4

The samples' mass loss due to exposing to high temperature environments was investigated which could be then related to permeability enhancement at high-temperature conditions. Cylindrical samples of 38.14)×22.9 mm were aged for 4 days at 38° C. then they were oven dried at 105° C. for 2 hours. The samples were then weighted before and after being subjected to the high temperature of 300° C. for 3 days. The loss in the weight after exposing the samples to high temperature (300° C.) was correlated to the amount of water absorbed by HNP.

Example 13

The UCS Results: HNP0 and HNP1

Figure 2:
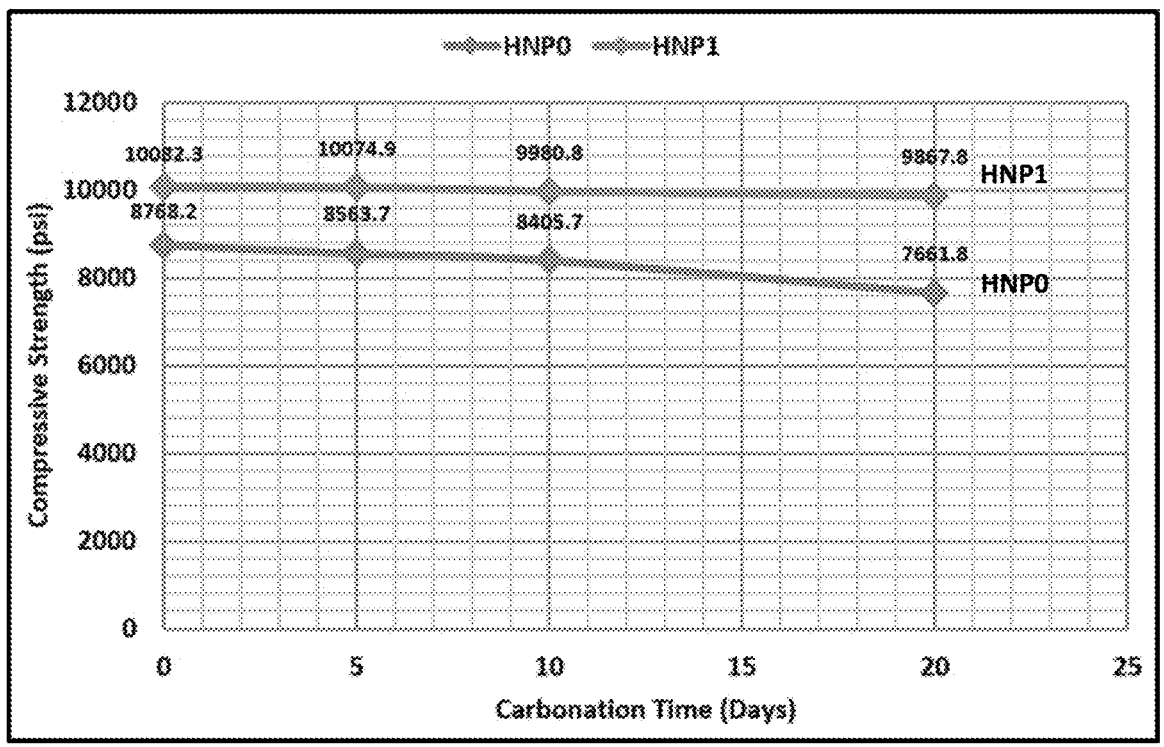
FIG. 2 is a graph showing changes in the compressive strength of HNP0 and HNP1 cement samples at different carbonation time.

FIG. 2 compares the compressive strength of the base sample (HNP0) and HNP-based cement matrixes (HNP1). This figure demonstrates that addition of 1.0% BWOC of HNP to the cement slurry has enhanced original strength from 8768.2 psi to 10082.3 psi at day zero before the carbonation reaction takes place. Such enhancement in matrix strength is attributed to an accelerated hydration process, formation of more stable CSH (calcium silicate hydrates) products, and a densified cement matrix by using HNP. The CSH products with a low Ca/Si ratio are found to be more stable in acidic brine compared to the CH (calcium hydroxide) [Duguid, A., Radonjic, M., Scherer, G. W., 2011. Degradation of cement at the reservoir/cement interface from exposure to carbonated brine. International Journal of Greenhouse Control 5, 1413-1428; and Yang, Y., Yuan, B., Wang, Y., Zhang, S., Zhu, L., 2016. Carbonation resistance cement for $CO_2$ storage and injection wells. Journal of Petroleum Science and Engineering 146, 883-889, each incorporated herein by reference in their entirety]. Since the HNP enhances transformation of CH products to more stable forms of CSH, a lower rate of decrease in the strength of the HNP-based cement was observed over 20 days of carbonation compared with the base samples. After 20 days of carbonation, the base sample lost 12.62% of its original strength, compared with 2.13% loss found in the strength of HNP-based cement (FIG. 2).

Example 14

Tensile Strength Results: HNP0 and HNP1

Figure 3:
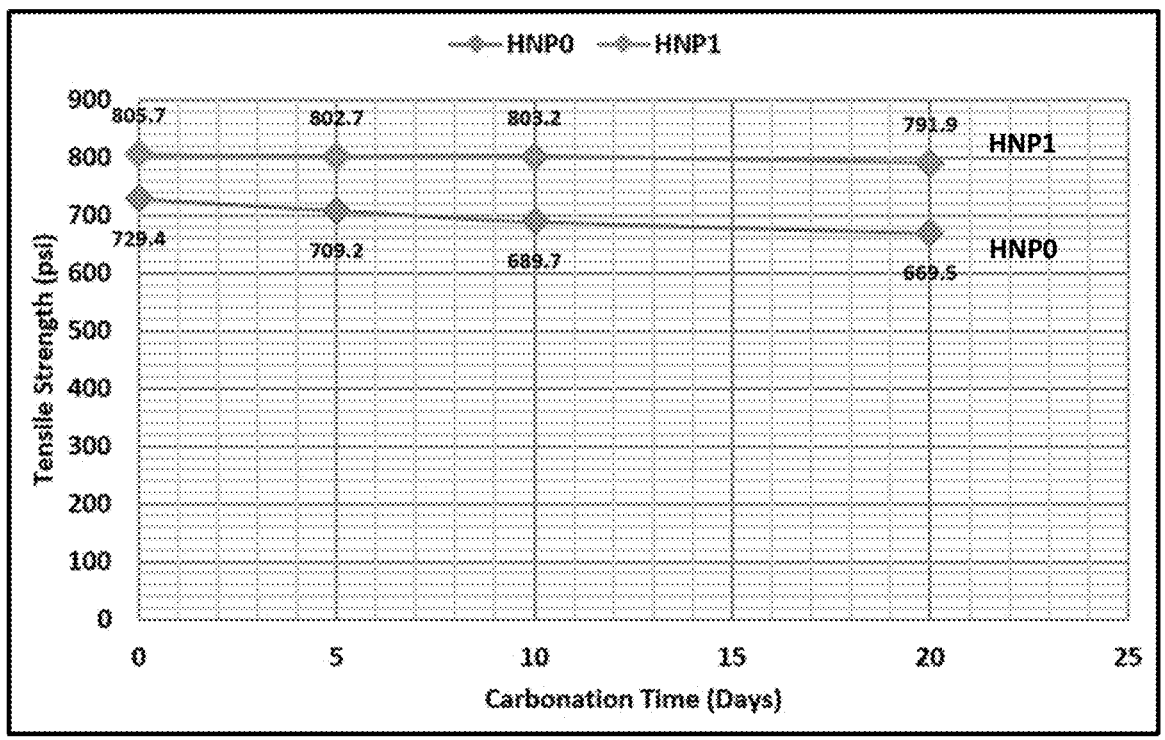
FIG. 3 is a graph showing changes in the tensile strength of HNP0 and HNP1 cement samples at different carbonation time.

FIG. 3 shows that the results of tensile strength followed the same trend as the compressive strength. The initial tensile strength of the HNP-based sample (805.7 psi) is greater than that of the base cement (729.4 psi), which is attributed to the ability of the HNP to form a densified cement matrix and improve the cement resistance to fail under tension. The high rate of the strength retrogression of the base cement sample was decreased when 1.0% BWOC of the HNP was added to the mixture. Total tensile strength declines of 8.21% and 1.27% were observed for the base and HNP-based samples, respectively.

Example 15

Porosity and Permeability Results: HNP0 and HNP1

Figure 4A:
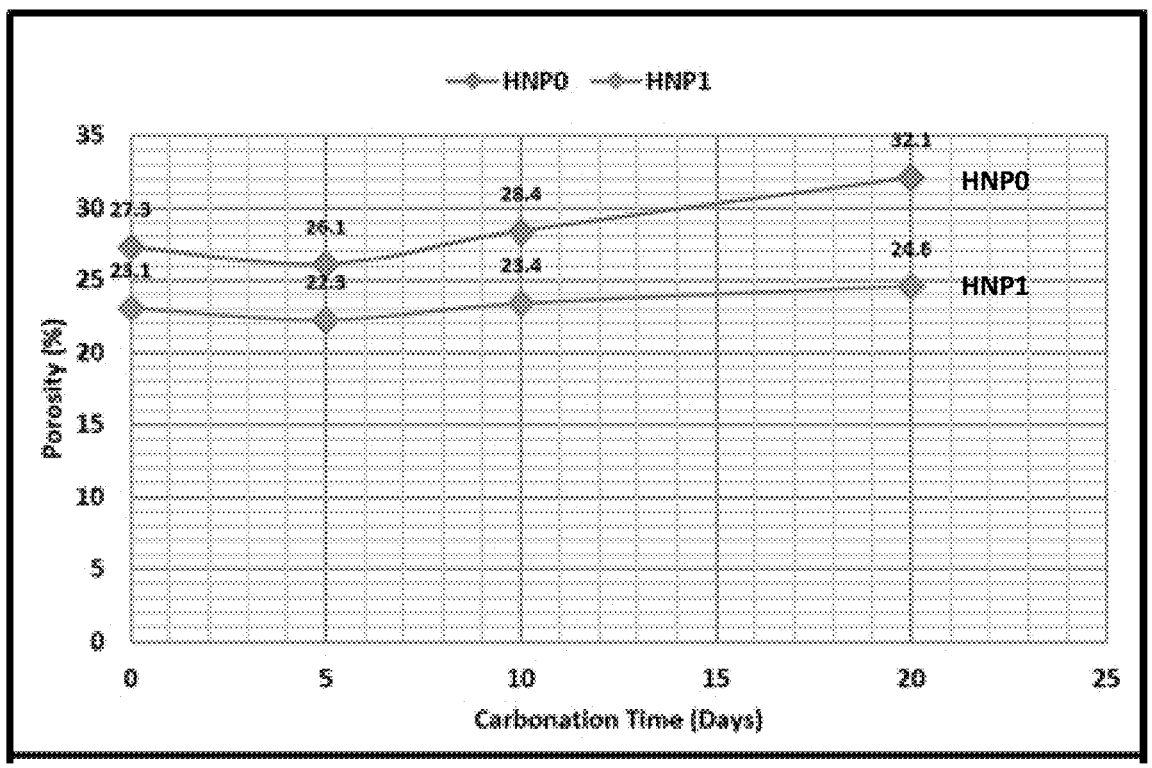
FIG. 4A is a graph showing changes in the porosity of HNP0 and HNP1 cement samples at different carbonation time.
Figure 4B:
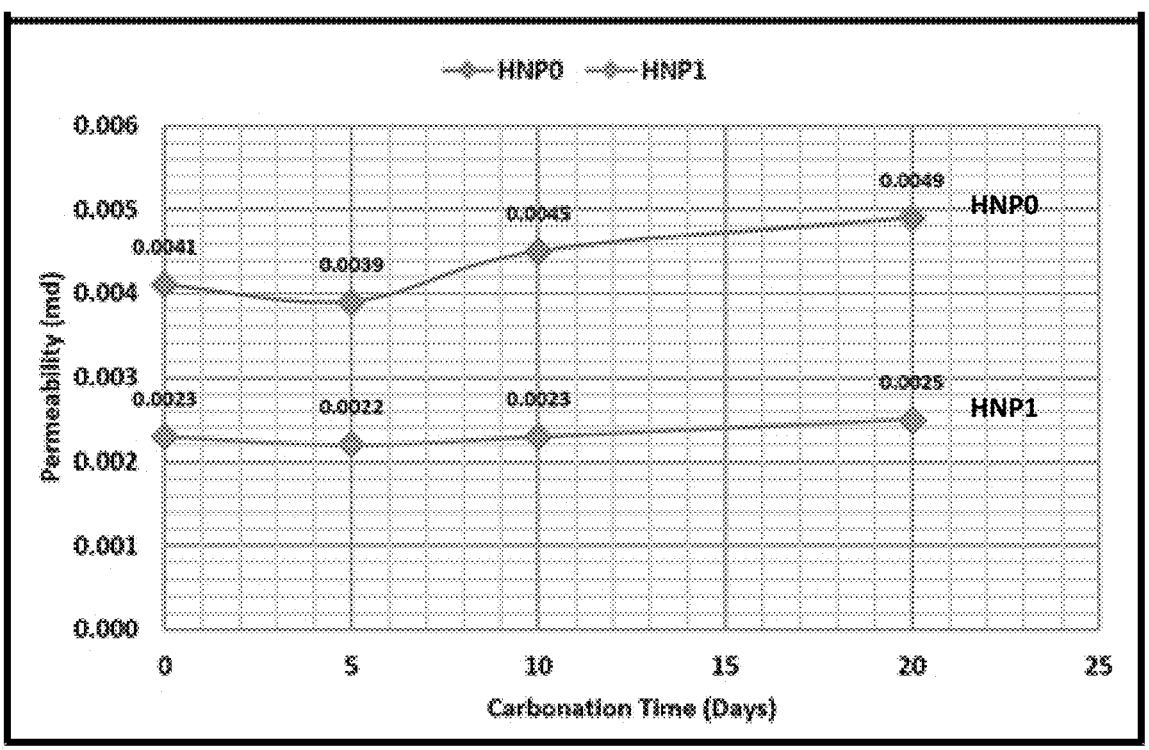
FIG. 4B is a graph showing changes in the permeability of HNP0 and HNP1 cement samples at different carbonation time.

The changes in porosity and permeability of cement samples at various carbonation times are shown in FIGS. 4A and 4B. The figure shows that porosity and permeability of the samples have slightly decreased after 5 days of being under the carbonation process. Such decreases in porosity and permeability are related to that fact that some pores are filled with carbonation products leading to weak leaching effect during this period. After 5 days, porosity of the base sample decreased from 27.3% to 26.1% (FIG. 4A) and its permeability changed from 0.0041 md to 0.0039 md (FIG. 4B). The porosity of HNP-based sample has declined from 23.1% to 22.3% (FIG. 4A) and permeability has decreased from 0.0023 md to 0.0022 md (FIG. 4B). After 5 days, both porosity and permeability of the samples have increased with longer carbonation time, and the rate of the increase of base samples is greater than that for the HNP-based samples, which could be related to the pore filling effect of the HNP.

After 20 days of carbonation, the porosity and permeability of the base cement samples have increased by 17.58% and 19.51%, respectively, while the porosity and permeability of the HNP-based samples have increased by 6.49% and 8.70%, respectively.

Example 16

Carbonation Resistance Mechanisms: HNP0 and HNP1

Two mechanisms are proposed to explain the carbonation resistance enhancement of HNP-based cement matrix. One is the decrease in matrix permeability as confirmed by this disclosure, and the other involves secondary transformation of the CH product (produced during cement hydration) to a more stable form of CSH, which is suggested earlier to be responsible for the concrete strength enhancement.

Example 17

UCS Results: S0H0, S35H0, S35H1, S35H2, S35H3, and S35H4

Figure 5:
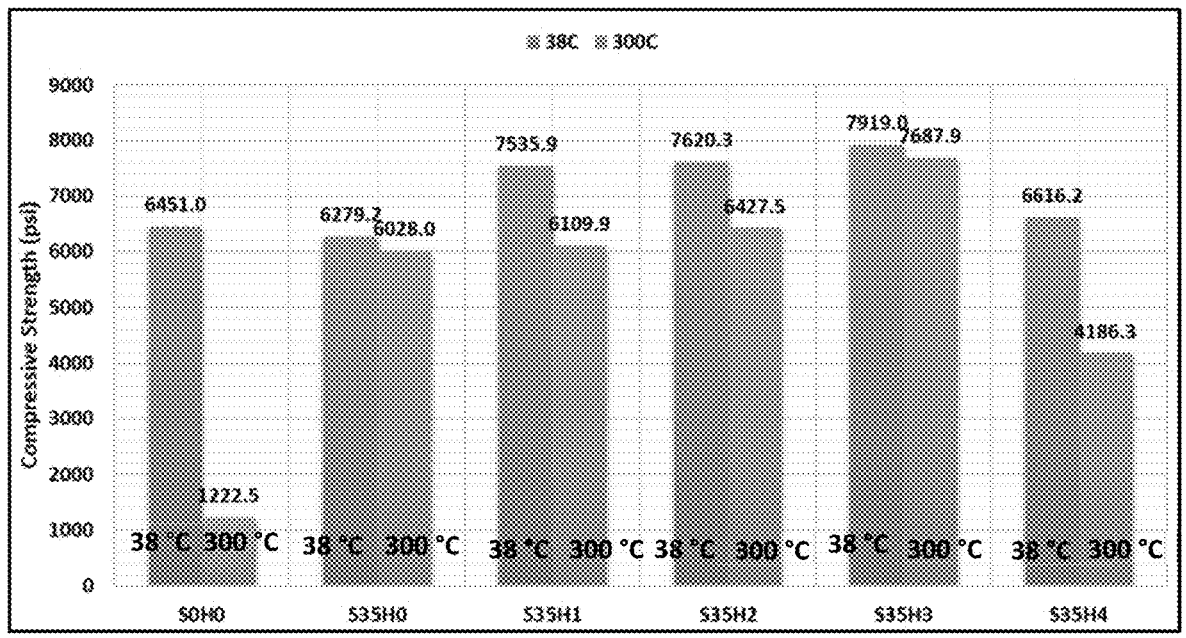
FIG. 5 is a graph summarizing the compressive strength of S0H0, S35H0, S35H1, S35H2, S35H3, and S35H4 cement samples cured at 38° C. and 300° C., respectively for 7 days.

FIG. 5 compares the change in the strength for all the cement formulations under study with or without being subjected to a temperature of 300° C. After 7 days of curing, the base sample (S0H0), which has zero SF and HNP content, lost 81.05% of its original strength when exposed to high temperature of 300° C. (i.e. decreased from 6451.0 psi to 1222.5 psi).

When 35% BWOC of the SF was added to the cement slurry (sample S35H0), a considerable increase in the resistance to strength retrogression at a temperature of 300° C. was observed. As shown in FIG. 5, after 7 days of exposure to 300° C. the strength of sample S35NCO is 6028.0 psi, compared to 1222.5 psi for the base sample S0H0. This is attributed to the fact that during the pozzolanic reaction, interactions of silica particles with the CH products lead to the formation of more stable CSH products during the hydration process [Bezerra, U. T., Martinelli, A. E., Melo, D. M. A., Melo, M. A. F., Oliveira, V. G., Pessoa, J., Nova, C. L., 2011. The strength retrogression of special class Portland oilwell cement. Ceramica 57, 150-154, incorporated herein by reference in its entirety].

Addition of HNP at up to 3.0% BWOC to the slurry having 35% SF further enhanced the cement strength under all temperatures tested. At low temperature (38° C.), addition of 3.0% of the HNP was able to increase the strength of the cement by 1639.8 psi compared with that obtained by using 35% of SF only (S35H0). Such enhancement may occur due to quick reaction of the HNP, which has extremely large surface area, amorphous state (small particle size), and free lime available for hydration process. As a result, more secondary CSH gel will be produced that effectively fills the cement matrix capillary pores and densify the microstructure of the matrix.

At the high temperature (300° C.), adding 1.0, 2.0, or 3.0% BWOC of the HNP to the slurry having 35% BWOC of SF has enhance the strength retrogression resistance compared to the sample S35H0 which has only SF particles (FIG. 5). The strength has increased to 7687.9 psi when 3.0% HNP is included compared to 6028.0 psi for sample S35H0.

Under both low and high temperatures, addition of 4.0% BWOC of NC (sample S35H4) has led to deterioration of the strength. In the case of high temperature scenario, the compressive strength becomes 4186.3 psi after 7 days, which is less than that of the sample with zero HNP (6028.0 psi). This decrease may be attributed to the fact that nanoparticles at high concentration could lead to agglomeration of nanoparticles in the mixes [Shebl S. S., Allie, L., Morsy, M. S., Aglan, H. A., 2009. Mechanical behavior of activated nano silicate filled cement binders. J Mater Sci 44(6), 1600-1606; and Hakamy, A., Shaikh, F. U. A., Low, I. M., 2014. Thermal and mechanical properties of hemp fabric-reinforced nanoclay-cement nanocomposites. Journal of Materials Science 49(4), 1684-1694, each incorporated herein by reference in their entirety]. Formation of weak zones occurs due to such aggregations, which in turn prevent homogenous hydrate formations, and drastically decrease the cement strength retrogression resistance at high temperature.

Example 18

Tensile Strength Results: S0H0, S35H0, S35H1, S35H2, S35H3, and S35H4

The tensile strength results of the cement samples are presented in FIG. 6. Sample S0H0 lost 66.3% of its tensile strength after being subjected to the high-temperature scenario for 7 days. Adding 35% of SF particles (sample S35H0) considerably enhanced the cement resistance to failure under tensile force and high-temperature conditions, due to the formation of stable forms of CSH during the pozzolanic reaction between $SiO_2$ and CH. Incorporating HNP (up to 3.0% BWOC) into the cement formulation further improved its tensile strength under high temperature, which was resulted from the accelerated hydration process. The cement resistance to tension declined when 4.0% of HNP is added because of overloaded nanoparticles and potential development of irregular microstructure.

Example 19

Permeability Measurement Results: S0H0, S35H0, S35H1, S35H2, S35H3, and S35H4

Figure 7:
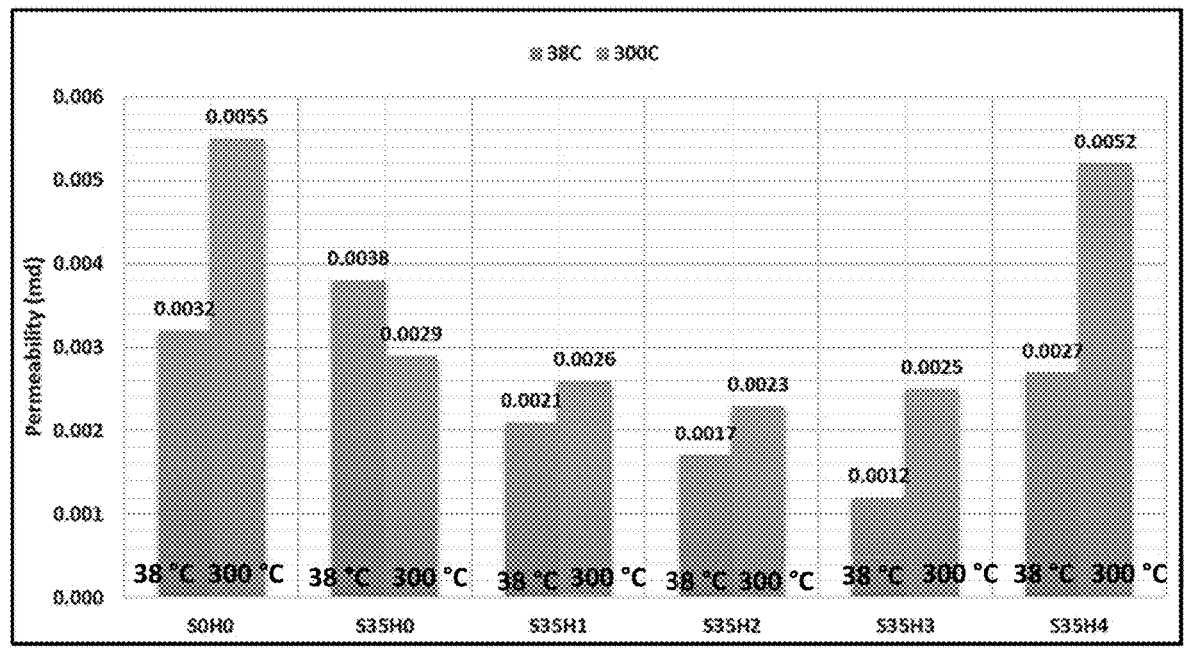
FIG. 7 is a graph summarizing the permeability of S0H0, S35H0, S35H1, S35H2, S35H3, and S35H4 cement samples cured at 38° C. and 300° C., respectively for 7 days.

FIG. 7 illustrates that permeability of the cement matrix having no SF or HNP (S0H0) increased by 71.88% from 0.0032 md to 0.0055 md when exposed to one cycle of steam injection. When 35% BWOC of SF was added (S35H0), the permeability of the sample decreased by 23.68%. This could be attributed to voids filling up due to matrix expansion at increasing temperatures, which was noticed for concrete mortars saturated with silica fume particles according to Frazadnia et al. [Farzadnia, N., Ali, A. A. A., Demirboga, R., Anwar, M. P., 2013. Effect of halloysite nanoclay on mechanical properties, thermal behavior and microstructure of cement mortars. Cement and Concrete Research 48, 97-104, incorporated herein by reference in its entirety].

Incorporating the HNP (<3.0%) into OWC decreased its original permeability considerably, which is a direct result of the high rate of hydration and denser microstructure of the cement matrix. For the high temperature scenario, the permeability increased for all HNP-based cement samples as a direct effect of the induced micro-crack shrinkage due to loss of bound water and absorbed water from the cement matrix and HNP, respectively. However, the permeability of the HNP-based samples (with NC of less than 3.0%) is less than that of the base samples S0H0 and S35H0.

Increasing the HNP concentration beyond 3.0% (i.e. 4.0% of HNP) as in case of sample S35H4 has led to a large increase in the permeability under low temperature condition by 108% compared to sample S35H3, which is caused by the agglomeration of nanoparticles resulting in irregular microstructure and thus high permeability. Under high temperature scenario, the permeability of the sample was drastically increased from 0.0027 md to 0.0052 md, which could be related to the induced micro-cracks caused by the high concentration of nanoparticles (i.e. more than 3.0%), as well as evaporated water from the cement matrix and loss of water absorbed by HNP at high temperature.

Example 20

Non-Evaporable Water Content Results: S0H0, S35H0, S35H1, S35H2, S35H3, and S35H4

Figure 8:
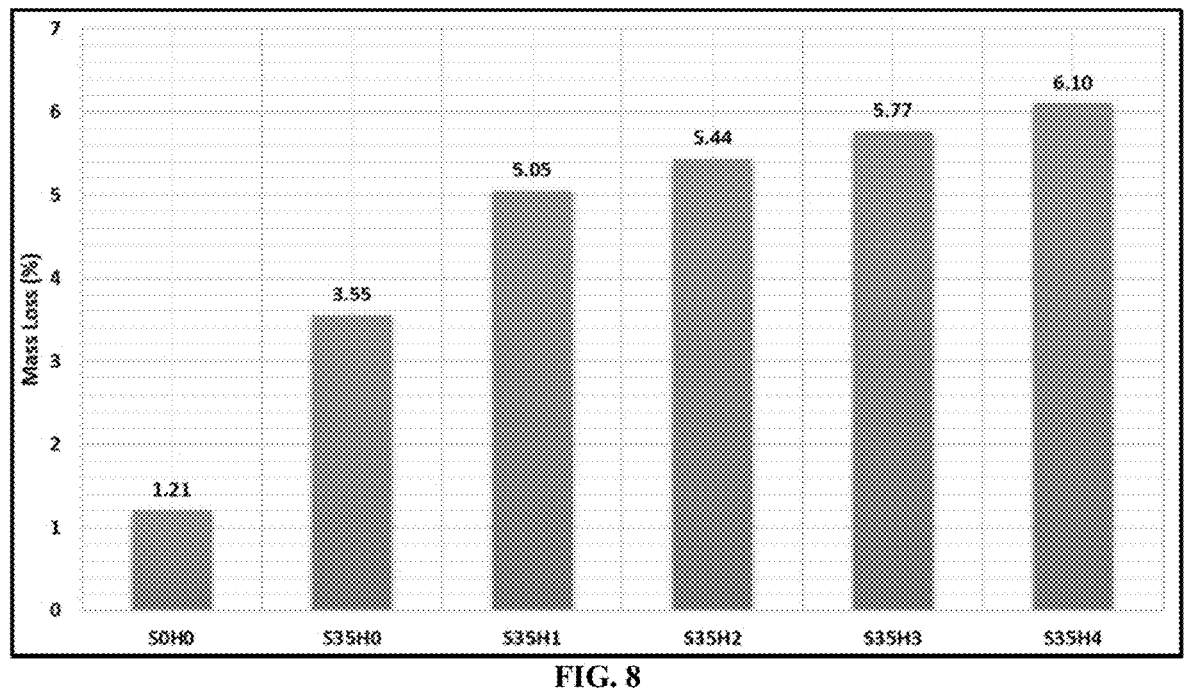
FIG. 8 is a graph showing the mass loss of S0H0, S35H0, S35H1, S35H2, S35H3, and S35H4 cement samples upon exposure to 300° C. for 3 days (72 hours) after being cured at 38° C. for 4 days.

FIG. 8 summarizes the mass loss of the samples being exposed to 300° C. for 3 days and then dried for 2 hours at 105° C. These samples were previously exposed to the high-temperature condition after being aged for 4 days at low-temperature condition of 38° C., so the total aging time was 7 days. The results in FIG. 8 show that the sample with no SF or HNP has minor loss of non-evaporable water of 1.21%. This result confirms that the huge enhancement in the permeability of sample S0H0 (FIG. 7) when exposed to the high-temperature condition is related to the matrix damage and not water evaporation. Adding SF particles increased the non-evaporable water content to 3.55% after 7 days.

Incorporating the HNP into the cement matrix has increased the concentration of the non-evaporable water, which confirms that the increases in the permeability of samples S35H1, S35H2, and S35H3 are mainly related to the evaporation of water absorbed by the HNP. Both samples S35H3 and S35H4 have high non-evaporable water concentration. However, the permeability enhancement for sample S35H4 is very high compared to sample S35H3 (FIG. 7). Accordingly, the enhancement in the permeability of S35H4 could not be confirmed to be mainly related to the highest non-evaporable water content of this sample.

Example 21

In this disclosure, the effect of incorporating the HNP into OWC formulation for applications of $CO_2$ sequestration at 95° C. and 10 MPa was evaluated based on cement compressive and tensile strengths, porosity, and permeability changes during 20 days of carbonation. We have concluded that: (i) addition of HNP was able to enhance the cement resistance to the strength retrogression during carbonation process from 12.62% to 2.13%; (ii) tensile strength reduction of the cement was decreased from 8.21% to 1.72% by incorporating HNP; (iii) both porosity and permeability increases were mitigated by incorporating the pore filling particles (e.g. HNP); and (iv) two mechanisms involving permeability reduction and secondary transformation of the CH to CSH are responsible for the enhancement of carbonation resistance for the nanoclay-based cement.

In addition, the effect of incorporating HNP into the cement formulation containing OWC and 35% BWOC silica flour was evaluated based on unconfined compressive strength, tensile strength, permeability, and non-evaporable water content of the cement matrix at low (38° C.) and high (300° C.) temperature conditions. Adding HNP with concentrations no more than 3.0% BWOC has improved the cement resistance to failure under compression and tension at low and high temperature situations as a result of accelerated cement hydration reaction. Reductions in permeability were also observed at both low and high temperatures by 62.5% and 54.5, respectively, compared to the cement samples with no silica and no HNP as well as to the samples containing silica only. The permeability of the HNP-based samples increased at high temperature conditions (300° C.) mainly because of the loss of non-evaporable water from the HNP interlayers. When the HNP are added at a concentration greater than 3.0% BWOC, agglomeration of nanoparticles adversely affects the compressive and tensile strengths at 38° C. and 300° C. The permeability of the samples also increased considerably due to the microstructure irregularity caused by nanoparticles agglomeration at low temperature and sample damage and loss of non-evaporable water at high temperature.

The invention claimed is:

1. A cementing composition, comprising:
   a hydraulic cement;
   a silica flour; and
   halloysite nanoparticles,
   wherein:
   the silica flour and the halloysite nanoparticles are unmodified;
   the silica flour is an α-quartz, having a particle size of from 20-50 μm,
   a weight ratio of the hydraulic cement to the silica flour is in a range of 2:1 to 6:1;
   the halloysite nanoparticles are present in an amount ranging from 1% to 3% by weight of the hydraulic cement;
   and the cementing composition is devoid of ground granulated blast furnace slag, and
   after 7 days exposure to water at 38° C. a permeability of a cured cement sample is from 0.0012 md to 0.0021 md,
   and after 7 days exposure to water at 300° C. a permeability of a cured cement sample is from 0.0023 md to 0.0026 md.

2. The cementing composition of claim 1, wherein a weight ratio of the hydraulic cement to the silica flour is in a range of 2.5:1 to 3.5:1.

3. The cementing composition of claim 1, wherein the hydraulic cement is Saudi Class G hydraulic cement.

4. The cementing composition of claim 1, further comprising at least one additive selected from the group consisting of a friction reducer; a fluid loss additive, and a defoamer.

5. The cementing composition of claim 1, consisting essentially of:
   the hydraulic cement;
   the silica flour;
   the halloysite nanoparticles;
   a friction reducer;
   a defoamer; and
   a fluid loss additive,
   wherein:
   a weight ratio of the hydraulic cement to the friction reducer is in a range of 50:1 to 250:1;
   a weight ratio of the hydraulic cement to the defoamer is in a range of $10^7$:1 to $10^9$:1; and
   a weight ratio of the hydraulic cement to the fluid loss additive is in a range of 60:1 to 275:1.

6. A cement slurry, comprising:
   the cementing composition of claim 5; and
   water,
   wherein a weight ratio of the hydraulic cement to the water is in a range of 1:1 to 4:1.

7. A method of cementing a portion of a wellbore, the method comprising:
   introducing the cement slurry of claim 6 into the portion of the wellbore; and
   allowing the cement slurry to cure thereby forming a wellbore cement.

8. The method of claim 7, wherein the wellbore has a temperature in a range of 50-300° C., and a pressure of 0.1-20 MPa.

9. The method of claim 7, wherein the wellbore cement has a compressive strength of 4,000-11,000 psi, and a tensile strength of 5001,000 psi.

10. The method of claim 9, further comprising exposing the wellbore cement to $CO_2$, saline, or both.

11. The method of claim 10, wherein the wellbore cement has a compressive strength 20-40% greater than that of a substantially identical cement not formed with the halloysite nanoparticles.

12. The method of claim 7, wherein the wellbore is a $CO_2$ injection wellbore, or a $CO_2$ sequestration wellbore.

13. The cementing composition of claim 1, consisting essentially of:
   the hydraulic cement;
   the silica flour;
   the halloysite nanoparticles; and
   a friction reducer,
   wherein a weight ratio of the hydraulic cement to the friction reducer is in a range of 50:1 to 250:1.

14. A cement slurry, comprising:
   the cementing composition of claim 3; and
   water,
   wherein a weight ratio of the hydraulic cement to the water is in a range of 1:1 to 4:1.

15. A method of cementing a portion of a wellbore, the method comprising:
   introducing the cement slurry of claim 14 into the portion of the wellbore; and
   allowing the cement slurry to cure thereby forming a wellbore cement.

16. The method of claim 15, wherein the wellbore has a temperature of 200-400° C., and wherein the wellbore cement has a compressive strength 20-30% greater than that of a substantially identical cement not formed with the silica flour and the halloysite nanoparticles.

17. The method of claim 15, further comprising exposing the wellbore cement to steam injection.

18. The method of claim 15, wherein the wellbore is a steam injection wellbore, or a high-pressure high-temperature wellbore.

19. The method of claim 15, wherein the wellbore is at least one selected from the group consisting of a horizontal wellbore, a vertical wellbore, and a multi-lateral wellbore.

20. The cementing composition of claim 1, consisting of:
the hydraulic cement;
the silica flour;
the halloysite nanoparticles;
a friction reducer;
a defoamer; and
a fluid loss additive,
wherein:
a weight ratio of the hydraulic cement to the silica flour is in a range of 2:1 to 6:1;
the halloysite nanoparticles are present in an amount ranging from 1% to 3% by weight of the hydraulic cement;
a weight ratio of the hydraulic cement to the friction reducer is in a range of 50:1 to 250:1;
a weight ratio of the hydraulic cement to the defoamer is in a range of $10^7:1$ to $10^9:1$; and
a weight ratio of the hydraulic cement to the fluid loss additive is in a range of 60:1 to 275:1.

* * * * *